US012575989B2

(12) United States Patent
Newkirk et al.

(10) Patent No.: US 12,575,989 B2
(45) Date of Patent: Mar. 17, 2026

(54) LATERAL SPINE SURGERY TOP FOR TWO COLUMN OPERATING TABLE

(71) Applicant: Allen Medical Systems, Inc., Batesville, IN (US)

(72) Inventors: David C. Newkirk, Lawrenceburg, IN (US); Joshua C. Hight, Littleton, MA (US); Ben W. Hertz, Littleton, MA (US)

(73) Assignee: Allen Medical Systems, Inc., Batesville, IN (US)

( * ) Notice: Subject to any disclaimer, the term of this patent is extended or adjusted under 35 U.S.C. 154(b) by 793 days.

(21) Appl. No.: 17/569,752

(22) Filed: Jan. 6, 2022

(65) Prior Publication Data

US 2022/0241128 A1 Aug. 4, 2022

Related U.S. Application Data

(60) Provisional application No. 63/143,048, filed on Jan. 29, 2021.

(51) Int. Cl.

| | |
|---|---|
| ***A61G 13/06*** | (2006.01) |
| ***A61G 7/057*** | (2006.01) |
| ***A61G 13/08*** | (2006.01) |
| ***A61G 13/12*** | (2006.01) |

(52) U.S. Cl.

CPC ......... *A61G 13/06* (2013.01); *A61G 7/05769* (2013.01); *A61G 13/08* (2013.01); *A61G 13/1205* (2013.01); *A61G 13/122* (2013.01); *A61G 13/1225* (2013.01); *A61G 13/123* (2013.01); *A61G 13/1235* (2013.01); *A61G 13/1265* (2013.01); *A61G 2200/322* (2013.01); *A61G 2210/50* (2013.01)

(58) Field of Classification Search

CPC .. A61G 13/122; A61G 13/0054; A61G 13/04; A61G 13/06; A61G 7/05769; A61G 13/08; A61G 13/1205; A61G 13/1225; A61G 13/123; A61G 13/1235; A61G 13/1265

USPC ............ 5/624, 613, 600, 610, 623, 607, 608

See application file for complete search history.

(56) References Cited

U.S. PATENT DOCUMENTS

| | | | | |
|---|---|---|---|---|
| 5,184,363 | A * | 2/1993 | Falbo, Sr. .............. | A61B 5/221<br>5/601 |
| 6,260,220 | B1 | 7/2001 | Lamb et al. | |
| 6,295,666 | B1 | 10/2001 | Takaura | |
| 6,367,104 | B1 * | 4/2002 | Falbo, Sr. ............ | A61B 6/0414<br>5/601 |

(Continued)

FOREIGN PATENT DOCUMENTS

| | | | |
|---|---|---|---|
| CN | 111557821 | A | 8/2020 |
| DE | 19925574 | A1 | 12/2000 |

*Primary Examiner* — Justin C Mikowski
*Assistant Examiner* — Deborah Talitha Gedeon
(74) *Attorney, Agent, or Firm* — Barnes & Thornburg LLP

(57) ABSTRACT

A surgical table includes a pair of lift columns. A table top extends between each of the pair of lift columns. The table top forms a patient support surface configured to receive a patient. The table top includes a head section, a leg section, and a torso section extending between the head section and the leg section. At least one retention pad extends from the table top and is configured to position against the patient. An arm rest extends from the head section and is configured to receive an arm of the patient.

26 Claims, 17 Drawing Sheets

(56) References Cited

U.S. PATENT DOCUMENTS

| | | | | |
|---|---|---|---|---|
| 6,820,621 | B2 * | 11/2004 | DeMayo | A61G 13/12<br>128/845 |
| 7,024,711 | B1 | 4/2006 | Stasney et al. | |
| 7,032,263 | B2 | 4/2006 | Falbo, Sr. et al. | |
| 9,072,646 | B2 * | 7/2015 | Skripps | A61G 13/04 |
| 9,554,959 | B2 | 1/2017 | Carn | |
| 10,561,559 | B2 | 2/2020 | Hight et al. | |
| 10,792,207 | B2 | 10/2020 | Hight et al. | |
| 10,940,072 | B2 | 3/2021 | Beale et al. | |
| 11,020,304 | B2 | 6/2021 | Lim et al. | |
| 11,202,731 | B2 | 12/2021 | Hertz et al. | |
| 2002/0157186 | A1 * | 10/2002 | VanSteenburg | A61G 13/04<br>5/621 |
| 2004/0133983 | A1 | 7/2004 | Newkirk et al. | |
| 2006/0248650 | A1 * | 11/2006 | Skripps | A61G 13/0054<br>5/624 |
| 2016/0193099 | A1 * | 7/2016 | Drake | A61G 13/04<br>5/624 |
| 2016/0361218 | A1 * | 12/2016 | Dubois | A61G 13/08 |
| 2017/0112698 | A1 * | 4/2017 | Hight | A61G 13/0054 |
| 2017/0135890 | A1 | 5/2017 | Dubois et al. | |
| 2021/0085550 | A1 | 3/2021 | Lim et al. | |

* cited by examiner

LATERAL SPINE SURGERY TOP FOR TWO COLUMN OPERATING TABLE

CROSS-REFERENCE TO RELATED APPLICATIONS

This application claims priority under 35 U.S.C. § 119(e) to U.S. Provisional Application No. 63/143,048, filed Jan. 29, 2021, which is expressly incorporated by reference herein.

BACKGROUND

The present disclosure relates to surgical tables and, more particularly, to a surgical table configured to facilitate accessing a surgical site of a patient positioned on the surgical table during lateral spine surgery.

Generally, during lateral spine surgery, the disk space is removed and the implant is inserted while the patient is in a lateral position. The patient is then transferred to a prone position for the placement of stabilizing rods and screws. However, when the surgeon tries to insert the stabilizing rods and screws, the table under the patient blocks access to properly placing the rods and screws. Accordingly, the patient needs to be positioned on the side of the table. By positioning the patient on the side of the table, the patient is no longer centered on the table causing interferences with the C-Arm and the table. Additionally, surgeons would prefer if the abdomen of the patient were to fall away from the surgical site to allow for the internal organs to remain out of the way during placement of the implants. Moreover, problems exist with the stability of the patient while in the lateral position. Tape is often used to secure the patient in the lateral position and often times the tape is not enough to properly keep the patient from shifting during surgery.

SUMMARY

The present disclosure includes one or more of the features recited in the appended claims and/or the following features which, alone or in any combination, may comprise patentable subject matter.

According to a first aspect of the disclosed embodiments, a surgical table includes a pair of lift columns coupled by a rod extending between each of the pair of lift columns. A table top extends between each of the pair of lift columns. The table top forms a patient support surface configured to receive a patient. The table top includes a head section, a leg section, and a torso section extending between the head section and the leg section. The torso section includes a center member. The center member is adjustable to adjust an angle of the center member relative to the head section and the leg section. The torso section includes a pair of side members. Each of the pair of side members is positioned on an opposite side of the center member. Each of the pair of side members is removeable from the position adjacent the center member to a stowed position. A chest retention pad extends from the head section and is configured to position against a chest of the patient. A back retention pad extends from the head section and is configured to position against a back of the patient. A thigh retention pad extends from the leg section and is configured to position against a thigh of the patient. An articulating C-arm extends from the head section and is configured to position around the patient and against an abdomen of the patient. A pair of arm rests extend from the head section. Each of the pair of arm rests is configured to receive an arm of the patient.

In some embodiments of the first aspect, each of the pair of lift columns may be adjustable to adjust a height of the respective lift column. Each of the pair of lift columns may include a base configured to position on a floor. An inner column may extend from the base. An outer column may be telescopically coupled to the inner column and configured to move between a lowered position and a raised position along a vertical axis of the inner column. Each of the pair of lift columns may include a column bracket having a plurality of opening pairs configured to receive a locking rod. Each of the head section and leg section of the table top may include a table bracket configured to receive the rod. Each table bracket may be configured to align with a respective column bracket so that the locking rod extends between the table bracket and one of the plurality of opening pairs to secure the table top to the respective lift column. Each of the pair of lift columns may be adjustable in height to adjust a height of the table top.

Optionally, in the first aspect, the center member of the torso section may include a pair of notches positioned on opposite sides of the center member. Each of the pair of side members may be positioned within a respective notch when each of the pair of side members is in the position adjacent the center member. When each of the pair of side members is in the position adjacent the center member, a top surface of each of the pair of side members may be substantially flush with a top surface of the center member. Each of the pair of side members may be coupled to an articulating assembly to move each of the pair of side members between the position adjacent the center member and the stowed position. The articulating assembly may include a side member bracket coupled to the respective side member. A sliding bracket may be coupled to a track extending along the leg section. An articulating arm may extend between the side member bracket and the sliding bracket. The articulating arm may rotate about both the side member bracket and the sliding bracket the lower the respective side member from the position adjacent the center member to a lowered position. The sliding bracket may move along the track to move the respective side member between the lowered position and the stowed position.

It may be desired, in the first aspect, that when the pair of side members are positioned in the stowed position, the torso section may include a notch that enables a surgeon to access a surgical site on the patient from below the patient. When the pair of side members are positioned in the stowed position, the torso section may include a notch that enables a medical imaging device to be positioned around the patient.

It may be contemplated, in the first aspect, that the center member of the torso section may include an actuator to adjust the angle of the center member relative to the head section and the leg section. The actuator may include an inflatable bladder. The angle of the center member relative to the head section and the leg section may be adjustable up to and including 15 degrees relative to the head section and the leg section.

In some embodiments of the first aspect, a chest retention post may extend vertically from the head section. A chest retention arm may extend horizontally from the chest retention post. The chest retention pad may be coupled to an end of the chest retention arm. The chest retention arm may be movable horizontally relative to the chest retention post to adjust a position of the chest retention pad. The chest retention pad may rotate relative to the chest retention arm to adjust a position of the chest retention pad. A back retention post may extend vertically from the head section.

A back retention arm may extend horizontally from the back retention post. The back retention pad may be coupled to an end of the back retention arm. The back retention arm may be movable horizontally relative to the back retention post to adjust a position of the back retention pad. The back retention pad may rotate relative to the back retention arm to adjust a position of the back retention pad. A thigh retention post may extend vertically from the leg section. A thigh retention arm may extend horizontally from the thigh retention post. The thigh retention pad may be coupled to an end of the thigh retention arm. The thigh retention arm may be movable horizontally relative to the thigh retention post to adjust a position of the thigh retention pad. The thigh retention pad may rotate relative to the thigh retention arm to adjust a position of the thigh retention pad.

Optionally, in the first aspect, each of the pair of side members of the torso section may include hip indicia. A hip of the patient may be aligned with the hip indicia, when the patient is positioned on the table top.

It may be desired, in the first aspect, that each of the arm rests extends horizontally from the head section. Each of the arm rests may be positioned adjacent the chest retention pad. Each of the arm rests may be positioned between the chest retention pad and a head end of the table top.

It may be contemplated, in the first aspect, that a mesh wrap may be configured to position around legs of the patient. The mesh wrap may cling to the table top to secure the patient on the table top. The mesh wrap may be disposable.

According to a second aspect of the disclosed embodiments, a surgical table includes a pair of lift columns coupled by a rod extending between each of the pair of lift columns. A table top extends between each of the pair of lift columns. The table top forms a patient support surface configured to receive a patient. The table top includes a head section, a leg section, and a torso section extending between the head section and the leg section. The torso section includes an inflatable bladder configured to adjust an angle of the torso section up to and including 15 degrees relative to the head section and the leg section. At least one retention pad extends from the table top and is configured to position against the patient. An arm rest extends from the head section and is configured to receive an arm of the patient.

In some embodiments of the second aspect, each of the pair of lift columns may be adjustable to adjust a height of the respective lift column. Each of the pair of lift columns may include a base configured to position on a floor. An inner column may extend from the base. An outer column may be telescopically coupled to the inner column and configured to move between a lowered position and a raised position along a vertical axis of the inner column. Each of the pair of lift columns may include a column bracket having a plurality of opening pairs configured to receive a locking rod. Each of the head section and leg section of the table top may include a table bracket configured to receive the rod. Each table bracket may be configured to align with a respective column bracket so that the locking rod extends between the table bracket and one of the plurality of opening pairs to secure the table top to the respective lift column. Each of the pair of lift columns may be adjustable in height to adjust a height of the table top.

Optionally, in the second aspect, the torso section may include a center member and a pair of side members. The center member may include a pair of notches positioned on opposite sides of the center member. Each of the pair of side members may be positioned within a respective notch when each of the pair of side members is in a position adjacent the center member. When each of the pair of side members is in the position adjacent the center member, a top surface of each of the pair of side members may be substantially flush with a top surface of the center member. Each of the pair of side members may be coupled to an articulating assembly to move each of the pair of side members between the position adjacent the center member and a stowed position. The articulating assembly may include a side member bracket coupled to the respective side member. A sliding bracket may be coupled to a track extending along the leg section. An articulating arm may extend between the side member bracket and the sliding bracket. The articulating arm may rotate about both the side member bracket and the sliding bracket the lower the respective side member from the position adjacent the center member to a lowered position. The sliding bracket may move along the track to move the respective side member between the lowered position and the stowed position. When the pair of side members are positioned in the stowed position, the notches may enable a surgeon to access a surgical site on the patient from below the patient. When the pair of side members are positioned in the stowed position, the notches may enable a medical imaging device to be positioned around the patient.

It may be desired, in the second aspect, that a chest retention post extends vertically from the head section. A chest retention arm may extend horizontally from the chest retention post. The at least one retention pad may include a chest retention pad coupled to an end of the chest retention arm. The chest retention arm may be movable horizontally relative to the chest retention post to adjust a position of the chest retention pad. The chest retention pad may rotate relative to the chest retention arm to adjust a position of the chest retention pad. A back retention post may extend vertically from the head section. A back retention arm may extend horizontally from the back retention post. The at least one retention pad may include a back retention pad coupled to an end of the back retention arm. The back retention arm may be movable horizontally relative to the back retention post to adjust a position of the back retention pad. The back retention pad may rotate relative to the back retention arm to adjust a position of the back retention pad. A thigh retention post may extend vertically from the leg section. A thigh retention arm may extend horizontally from the thigh retention post. The at least one retention pad may include a thigh retention pad coupled to an end of the thigh retention arm. The thigh retention arm may be movable horizontally relative to the thigh retention post to adjust a position of the thigh retention pad. The thigh retention pad may rotate relative to the thigh retention arm to adjust a position of the thigh retention pad.

It may be contemplated, in the second aspect, that the torso section may include hip indicia. A hip of the patient may be aligned with the hip indicia, when the patient is positioned on the table top.

In some embodiments of the second aspect, the arm rest may extend horizontally from the head section. The arm rest may be positioned adjacent the at least one retention pad. The arm rest may be positioned between the at least one retention pad and a head end of the table top.

Optionally, in the second aspect, a mesh wrap may be configured to position around legs of the patient. The mesh wrap may cling to the table top to secure the patient on the table top. The mesh wrap may be disposable.

According to a third aspect of the disclosed embodiments, a surgical table includes a pair of lift columns coupled by a rod extending between each of the pair of lift columns. A table top extends between each of the pair of lift columns.

The table top forms a patient support surface configured to receive a patient. The table top includes a head section, a leg section, and a torso section extending between the head section and the leg section. The torso section includes a center member and a pair of side members. Each of the pair of side members is positioned on an opposite side of the center member. A side member bracket is coupled to a respective side member. A sliding bracket is coupled to a track extending along the leg section. An articulating arm extends between the side member bracket and the sliding bracket. The articulating arm rotates about both the side member bracket and the sliding bracket the lower the respective side member from an extended position to a lowered position. The sliding bracket moves along the track to move the respective side member between the lowered position and a stowed position. At least one retention pad extends from the table top and is configured to position against the patient. An arm rest extends from the head section and configured to receive an arm of the patient.

In some embodiments of the third aspect, each of the pair of lift columns may be adjustable to adjust a height of the respective lift column. Each of the pair of lift columns may include a base configured to position on a floor. An inner column may extend from the base. An outer column may be telescopically coupled to the inner column and configured to move between a lowered position and a raised position along a vertical axis of the inner column. Each of the pair of lift columns may include a column bracket having a plurality of opening pairs configured to receive a locking rod. Each of the head section and leg section of the table top may include a table bracket configured to receive the rod. Each table bracket is configured to align with a respective column bracket so that the locking rod extends between the table bracket and one of the plurality of opening pairs to secure the table top to the respective lift column. Each of the pair of lift columns may be adjustable in height to adjust a height of the table top.

Optionally, in the third aspect, the center member of the torso section may include a pair of notches positioned on opposite sides of the center member. Each of the pair of side members may be positioned within a respective notch when each of the pair of side members is in the extended position. When each of the pair of side members is in the extended position, a top surface of each of the pair of side members may be substantially flush with a top surface of the center member. When the pair of side members are positioned in the stowed position, the torso section may include a notch that enables a surgeon to access a surgical site on the patient from below the patient. When the pair of side members are positioned in the stowed position, the torso section may include a notch that enables a medical imaging device to be positioned around the patient. In the stowed position, the pair of side members may be positioned below the leg section.

It may be desired, in the third aspect, that the center member of the torso section may include an actuator to adjust an angle of the center member relative to the head section and the leg section. The actuator may include an inflatable bladder. The angle of the center member relative to the head section and the leg section may be adjustable up to and including 15 degrees relative to the head section and the leg section.

It may be contemplated, in the third aspect, that a chest retention post may extend vertically from the head section. A chest retention arm may extend horizontally from the chest retention post. The at least one retention pad may include a chest retention pad coupled to an end of the chest retention arm. The chest retention arm may be movable horizontally relative to the chest retention post to adjust a position of the chest retention pad. The chest retention pad may rotate relative to the chest retention arm to adjust a position of the chest retention pad. A back retention post may extend vertically from the head section. A back retention arm may extend horizontally from the back retention post. The at least one retention pad may include a back retention pad coupled to an end of the back retention arm. The back retention arm may be movable horizontally relative to the back retention post to adjust a position of the back retention pad. The back retention pad may rotate relative to the back retention arm to adjust a position of the back retention pad. A thigh retention post may extend vertically from the leg section. A thigh retention arm may extend horizontally from the thigh retention post. The at least one retention pad may include a thigh retention pad coupled to an end of the thigh retention arm. The thigh retention arm may be movable horizontally relative to the thigh retention post to adjust a position of the thigh retention pad. The thigh retention pad may rotate relative to the thigh retention arm to adjust a position of the thigh retention pad.

In some embodiments of the third aspect, each of the pair of side members of the torso section may include hip indicia. A hip of the patient may be aligned with the hip indicia, when the patient is positioned on the table top.

Optionally, in the third aspect, the arm rest may extend horizontally from the head section. The arm rest may be positioned adjacent the at least one retention pad. The arm rest may be positioned between the at least one retention pad and a head end of the table top.

It may be desired, in the third aspect, that a mesh wrap is configured to position around legs of the patient. The mesh wrap may cling to the table top to secure the patient on the table top. The mesh wrap may be disposable.

According to a fourth aspect of the disclosed embodiments, a surgical table assembly includes a pair of lift columns coupled by a rod extending between each of the pair of lift columns. A table top extends between each of the pair of lift columns. The table top forms a patient support surface configured to receive a patient. The table top includes a head section, a leg section, and a torso section extending between the head section and the leg section. At least one retention pad extends from the table top and is configured to position against the patient. An arm rest extends from the head section and is configured to receive an arm of the patient. A disposable mesh wrap is configured to position around legs of the patient. The mesh wrap clings to the table top to secure the patient on the table top.

In some embodiments of the fourth aspect, each of the pair of lift columns may be adjustable to adjust a height of the respective lift column. Each of the pair of lift columns may include a base configured to position on a floor. An inner column may extend from the base. An outer column may be telescopically coupled to the inner column and configured to move between a lowered position and a raised position along a vertical axis of the inner column. Each of the pair of lift columns may include a column bracket having a plurality of opening pairs configured to receive a locking rod. Each of the head section and leg section of the table top may include a table bracket configured to receive the rod. Each table bracket may be configured to align with a respective column bracket so that the locking rod extends between the table bracket and one of the plurality of opening pairs to secure the table top to the respective lift column. Each of the pair of lift columns may be adjustable in height to adjust a height of the table top.

Optionally, in the fourth aspect, the torso section may include a center member having a pair of notches. A pair of side members may be positioned within a respective notch when each of the pair of side members is in a position adjacent the center member. When each of the pair of side members is in the position adjacent the center member, a top surface of each of the pair of side members may be substantially flush with a top surface of the center member. Each of the pair of side members may be coupled to an articulating assembly to move each of the pair of side members between the position adjacent the center member and a stowed position below the leg section. The articulating assembly may include a side member bracket coupled to the respective side member. A sliding bracket may be coupled to a track extending along the leg section. An articulating arm may extend between the side member bracket and the sliding bracket. The articulating arm may rotate about both the side member bracket and the sliding bracket the lower the respective side member from the position adjacent the center member to a lowered position. The sliding bracket may move along the track to move the respective side member between the lowered position and the stowed position. The pair of notches may enable a surgeon to access a surgical site on the patient from below the patient. The pair of notches may enable a medical imaging device to be positioned around the patient.

It may be desired, in the fourth aspect, that the center member of the torso section may include an actuator to adjust an angle of the center member relative to the head section and the leg section. The actuator may include an inflatable bladder. The angle of the center member relative to the head section and the leg section may be adjustable up to and including 15 degrees relative to the head section and the leg section.

It may be contemplated, in the fourth aspect, that a chest retention post may extend vertically from the head section. A chest retention arm may extend horizontally from the chest retention post. The at least one retention pad may include a chest retention pad coupled to an end of the chest retention arm. The chest retention arm may be movable horizontally relative to the chest retention post to adjust a position of the chest retention pad. The chest retention pad may rotate relative to the chest retention arm to adjust a position of the chest retention pad. A back retention post may extend vertically from the head section. A back retention arm may extend horizontally from the back retention post. The at least one retention pad may include a back retention pad coupled to an end of the back retention arm. The back retention arm may be movable horizontally relative to the back retention post to adjust a position of the back retention pad. The back retention pad may rotate relative to the back retention arm to adjust a position of the back retention pad. A thigh retention post may extend vertically from the leg section. A thigh retention arm may extend horizontally from the thigh retention post. The at least one retention pad may include a thigh retention pad coupled to an end of the thigh retention arm. The thigh retention arm may be movable horizontally relative to the thigh retention post to adjust a position of the thigh retention pad. The thigh retention pad may rotate relative to the thigh retention arm to adjust a position of the thigh retention pad.

In some embodiments of the fourth aspect, the torso section may include hip indicia. A hip of the patient may be aligned with the hip indicia, when the patient is positioned on the table top.

Optionally, in the fourth aspect, the arm rest may extend horizontally from the head section. The arm rest may be positioned adjacent the at least one retention pad. The arm rest may be positioned between the at least one retention pad and a head end of the table top.

In a fifth aspect of the disclosed embodiments, a surgical table includes a pair of lift columns coupled by a rod extending between each of the pair of lift columns. A table top extends between each of the pair of lift columns. The table top forms a patient support surface configured to receive a patient. The table top includes a head section, a leg section, and a torso section extending between the head section and the leg section. The torso section includes a center member having a main body and a pair of notches formed on opposite sides of the main body. A pair of side members is included. Each of the pair of side members is positioned on an opposite side of the center member in a respective notch. Each of the pair of side members is removable from the respective notch.

In some embodiments of the fifth aspect, a side member bracket may be coupled to a respective side member. A sliding bracket may be coupled to a track extending along the leg section. An articulating arm may extend between the side member bracket and the sliding bracket. The articulating arm may rotate about both the side member bracket and the sliding bracket the lower the respective side member from an extended position to a lowered position. The sliding bracket may move along the track to move the respective side member between the lowered position and a stowed position.

Optionally, in the fifth aspect, each of the side members may be hingedly coupled to the table top so that each of the side members is rotatable under the table top. Each of the side members may be hingedly coupled to the center member so that each of the side members is rotatable under the center member. Each of the side members may be hingedly coupled to the leg section of the table top so that each of the side members is rotatable under the leg section.

It may be desirable, in the fifth aspect, that a center member slot may be positioned on each side of the center member. A leg section frame may be positioned on each side of the leg section. A side member clip may be position on each of the side member. The side member clip of each side member may be attachable to a respective center member slot to position each side member in the respective notch of the torso section. The side member clip of each side member may be attachable to a respective leg section frame to store each side member under the leg section.

It may be contemplated, in the fifth aspect, that each side member may include an inflatable bladder. The inflatable bladder may be inflated to fill the notch with the respective side member. The inflatable bladder may be deflated to create a void in the respective notch.

According to a sixth aspect of the disclosed embodiments, a surgical table includes a pair of lift columns coupled by a rod extending between each of the pair of lift columns. A table top extends between each of the pair of lift columns. The table top forms a patient support surface configured to receive a patient. The table top includes a head section, a leg section, and a torso section extending between the head section and the leg section. A retention post extends vertically from the table top. The retention post includes a lower post and an upper post that is rotatable relative to the lower post. The upper post is telescopically moveable in a vertical direction along the lower post. A retention blade extends through a slot in the upper post of the retention post. The retention blade is horizontally moveable through the slot. A retention pad is coupled to an end of the retention blade and configured to position against the patient.

In some embodiments of the sixth aspect, the upper post of the retention post may move vertically relative to the lower post of the retention post to adjust a position of the retention pad. The upper post of the retention post may rotate relative to the lower post of the retention post to adjust a position of the retention pad. The retention blade may move horizontally through the slot of the retention post to adjust a position of the retention pad.

Optionally, in the sixth aspect, the retention post may include a chest retention post extending vertically from the head section. The retention blade may include a chest retention blade extending horizontally from the chest retention post. The retention pad may include a chest retention pad coupled to an end of the chest retention blade and configured to position against a chest of the patient. The retention post may include a back retention post extending vertically from the head section. The retention blade may include a back retention blade extending horizontally from the back retention post. The retention pad may include a back retention pad coupled to an end of the back retention blade and configured to position against a back of the patient. The retention post may include a thigh retention post extending vertically from the leg section. The retention blade may include a thigh retention blade extending horizontally from the thigh retention post. The retention pad may include a thigh retention pad coupled to an end of the thigh retention blade and configured to position against a thigh of the patient.

In some embodiments of the sixth aspect, a post locking mechanism that is adjustable between a locked position and an unlocked position may be provided. In the unlocked position, the upper post of the retention post may move freely relative to the lower post of the retention post. In the locked position, the upper post may be locked relative to the lower post to prevent vertical movement of the upper post and rotation of the upper post. The post locking mechanism may include a screw. A blade locking mechanism that is adjustable between a locked position and an unlocked position may be provided. In the unlocked position the retention blade may be horizontally moveable relative to the retention post. In the locked position, the blade locking mechanism may prevent movement of the retention blade relative to the retention post. The blade locking mechanism may include a screw.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which:

FIG. 24 is a perspective view of the surgical table shown in FIG. 1 and having a patient positioned on the surgical table, wherein FIG. 24 is an anterior view of the patient having arms positioned on arm rests and a mesh wrap positioned around the patient's legs;

DETAILED DESCRIPTION

Figure 1:
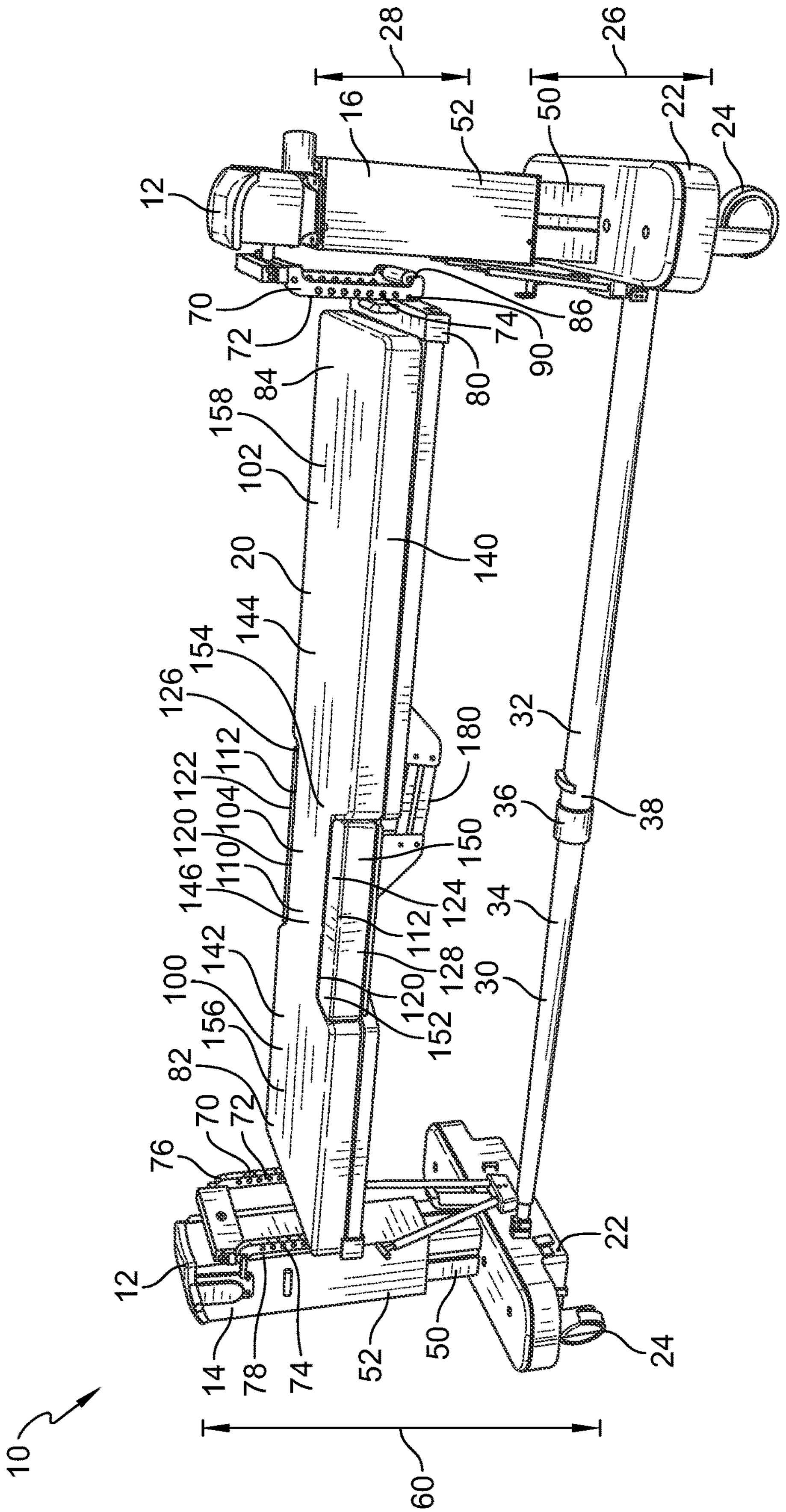
FIG. 1 is a perspective view of a surgical table formed in accordance with an embodiment and configured to receive a patient for a surgical procedure.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a surgical table 10 includes a pair of lift columns 12. The pair of lift columns 12 includes a head end lift column 14 and a foot end lift column 16. The pair of lift columns 12 is configured to support a table top 20 that extends between the head end lift column 14 and the foot end lift column 16. Each of the pair of lift columns 12 includes a base 22 having casters 24 that enable the lift columns 12 to be rolled throughout a healthcare facility. When the surgical table 10 is fully assembled with the table top 20 coupled to the pair of lift columns 12, the entire table top 20 can be rolled throughout the healthcare facility on the casters 24. In the illustrative embodiment, the base 22 of each lift column 12 has a width 26 that is greater than a width 28 of the table top 20 to provide support to the table top 20 and prevent the table top 20 from tipping. A rod 30 extends between the head end lift column 14 and the foot end lift column 16. In particular, the rod 30 extends between the respective base 22 of the head end lift column 14 and the foot end lift column 16. The rod 30 includes an outer rod 32 and an inner rod 34. The inner rod 34 is telescopically attached to the outer rod 32 so that the inner rod 34 is moveable from a retracted position and an extended position relative to the outer rod 32. In the extended position, the rod 30 has a length that is greater than a length of the rod 30 in the retracted position. The inner rod 34 is moveable to any intermediate length between the extended position and the retracted position. A nut 36 positioned on an end 38 of the outer rod 32 is tightened to secure the inner rod 34 relative to the outer rod 32. The rod 30 is adjustable in length 40 to adjust a distance between the head end lift column 14 and the foot end lift column 16. Accordingly, a distance between the head end lift column 14 and the foot end lift column 16 is adjustable to accommodate different length table tops 20.

Figure 2:
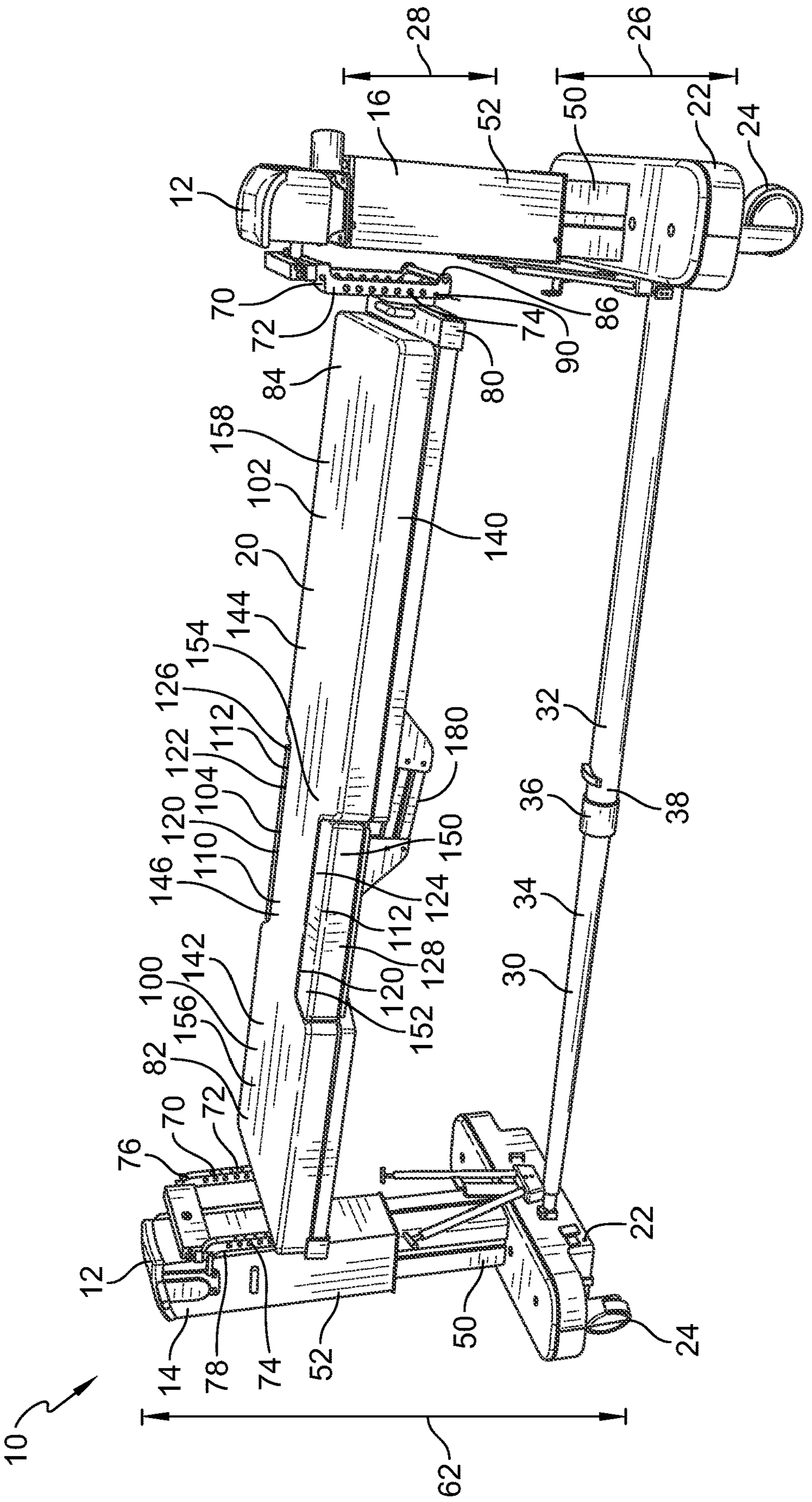
FIG. 2 is a perspective view of the surgical table shown in FIG. 1 and having a head end lift column raised relative to a foot end lift column to position a table top of the surgical table at an angle.

Each lift column 12 includes an inner column 50 that extends upward from the base 22. An outer column 52 is telescopically positioned on the inner column 50. The outer column 52 is adjustable relative to the inner column 50 to adjust a height of the outer column 52. That is, the outer column 52 may be raised and lowered relative to the inner column 50. For example, FIG. 1 illustrates the outer column 52 of the head end lift column 14 at a first height 60, and FIG. 2 illustrates the outer column 52 of the head end column 14 at a second height 62 that is greater than the first height 60. It should be appreciated that the outer column 52 is positionable at a height less than the first height 60 or greater than the second height 62. It should also be appreciated that the outer column 52 is positionable at an intermediate height between the first height 60 and the second height 62. While FIG. 2 only illustrate the outer column 52 of the head end lift column 14 raised to the second height 62, one of skill in the art will recognize that a height outer column 52 of the foot end lift column 16 may also be adjusted by raising or lower the outer column 52 of the foot end lift column 16. Accordingly, the respective outer column 52 of each of the head end lift column 14 and the foot end lift column 16 may be adjusted to the same height to maintain the table top 20 in a level, horizontal position. Likewise, the respective outer column of each of the head end lift column 14 and the foot end lift column 16 may be adjusted to different heights to positioned the table top 20 at an angle, as illustrated in FIG. 2. In some embodiments, the lift columns 12 may include an actuator to raise and lower the outer column 52. For example, a controller (not shown) may be operable to electronically raise and lower the outer column 52. In other embodiments, the outer column 52 may be manually raised or lowered by a technician or healthcare provider.

Each of the lift columns 12 includes a column bracket 70 coupled to the outer column 52. The column bracket 70 includes a pair of posts 72 extending vertically relative to the outer column 52. Each post 72 includes a plurality of openings 74. The openings 74 of a first post 76 are aligned with the openings 74 of a second post 78 to form a pair of openings 74. The table top 20 includes a pair of table brackets 80, wherein one of the table brackets 80 is positioned at a head end 82 of the table top 20, and a second of the table brackets 80 is positioned an a foot end 84 of the table top. Each of the table brackets 80 includes a pair of aligned openings 86. To secure the table top 20 to the lift columns 12, the openings 86 of the table bracket 80 are aligned with a pair of openings 74 of the respective column bracket 70. A rod 90 is inserted through the pair of aligned openings 86 and the pair of openings 74 to secure the table bracket 80 to the column bracket 70. It will be appreciated that the table bracket 80 at the foot end 84 of the table top 20 is secured to the column bracket 70 of the foot end lift column 16, and the table bracket 80 at the head end 82 of the table top 20 is secured to the column bracket 70 of the head end lift column 14. A height of the table top 20 is adjustable by selectively securing the table brackets 80 to different pairs of openings 74 in the respective column brackets 70.

The table top 20 includes a head section 100, a leg section 102, and a torso section 104. The head section 100 is coupled to the head end lift column 14. That is, one of the table brackets 80 is positioned on the head section 100 and configured to secure to the column bracket 70 on the head end lift column 14. The head section 100 extends from the head end lift column 14 to the torso section 104. The leg section 102 is coupled to the foot end lift column 16. That is, one of the table brackets 80 is positioned on the leg section 102 and configured to secure to the column bracket 70 of the foot end lift column 16. The leg section 102 extends from the foot end lift column 16 to the torso section 104. The torso section 104 extends between the head section 100 and the leg section 102.

The torso section 104 includes a center member 110 and a pair of side members 112. In the illustrative embodiment, the center member 110 of the torso section 104 is formed as a continuous table top 20 with the head section 100 and the leg section 102. The center member 110 includes a pair of notches 120 formed on opposite sides of the center member 110. The pair of notches 120 includes a left side notch 122 and a right side notch 124. Each of the pair of side members 112 is configured to position within a respective notch 120, when the side members 112 are in an extended position, as illustrated in FIG. 1. The pair of side members 112 includes a left side member 126 and a right side member 128. In the extended position, the left side member 126 is positioned within the left side notch 122 and the right side member 128 is positioned in the right side notch 124.

A patient support surface 140 is positioned over the table top 20. The patient support surface 140 may be formed from foam, gel, or any other suitable material for supporting a patient. The patient support surface 140 includes a head section 142, a leg section 144, and a torso section 146 formed as a continuous surface. The head section 142 is positioned over the head section 100 of the table top 20. The leg section 144 is positioned over the leg section 102 of the table top 20. The torso section 146 is positioned over the center member 110 of the torso section 104 of the table top 20. Each of the pair of side members 112 of the torso section 104 includes a side member pad 150. In the extended position, a top surface 152 of each side member pad 150 is substantially flush with a top surface 154 of the torso section 146 of the patient support surface 140. In the extended position, the top surface 152 of each side member pad 150 is substantially flush with a top surface 156 of the head section 142 of the patient support surface 140 and a top surface 158 of the leg section 144 of the patient support surface 140.

Figure 3:
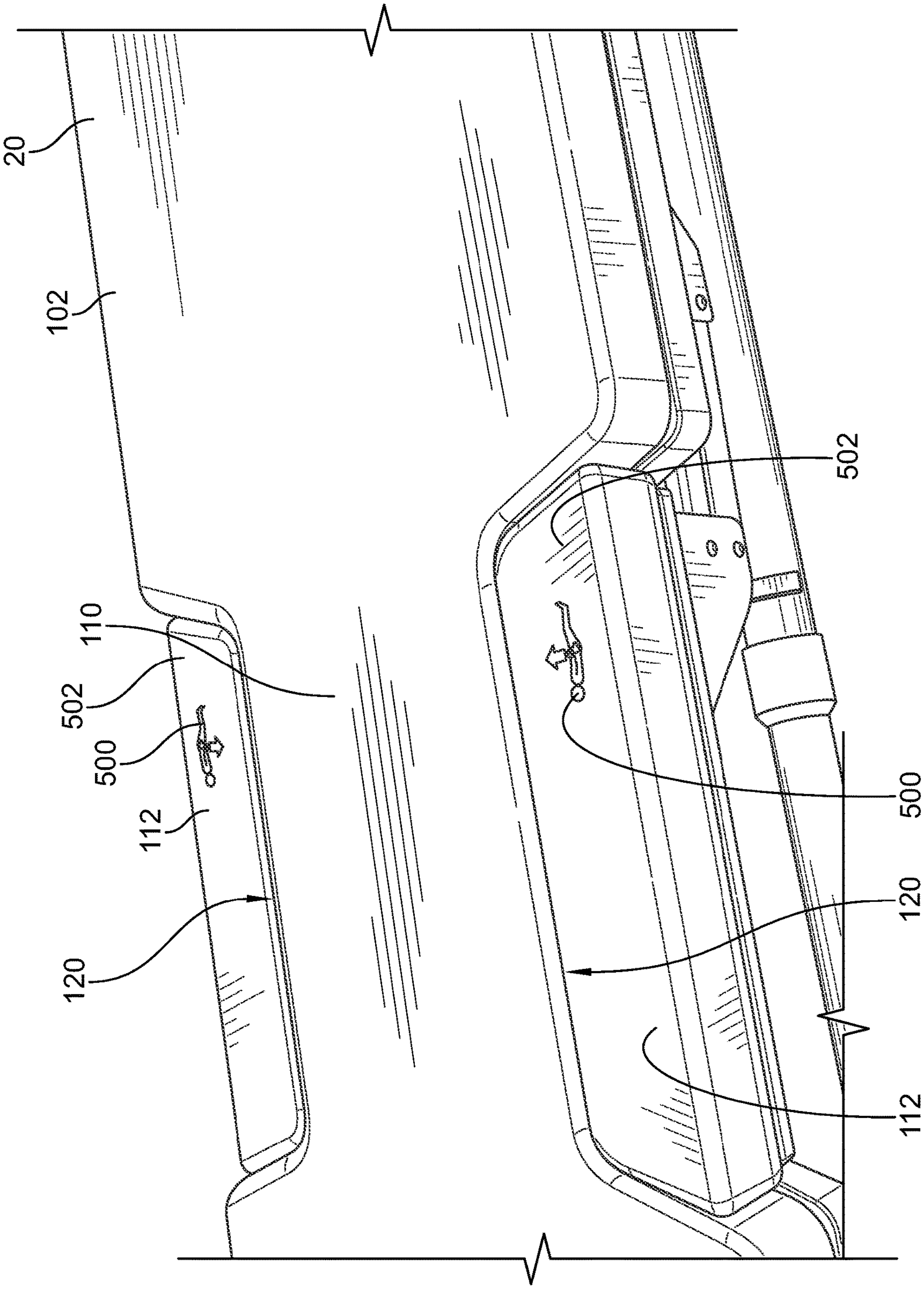
FIG. 3 is a perspective view of hip indicia positioned on the side members of the surgical table shown in FIG. 1, wherein the hip indicia are configured to align the patient on the surgical table.

Referring now to FIG. 3, the side members 112 include hip indicia 500. The hip indicia 500 indicates to a caregiver where to position the hips of the patient on the surgical table 10. By aligning the patient's hips with the hip indicia 500, a surgical site of the patient is aligned with the notches 120 in the center member 110 to enable access to the surgical site, when the patient is positioned on the surgical table 10. Additionally, properly aligning the patient's hips with the hip indicia 500 facilitates aligning the retention pads 200 (described in FIG. 7) against the patient's chest, back, and thigh, respectively. The hip indicia 500 is positioned on each side member 112 to enable facing the patient in either direction on the surgical table 10. In the exemplary embodiment, the hip indicia 500 is positioned on an end 502 of the side members 112 adjacent the leg section 102 of the table top 20.

Figure 4:
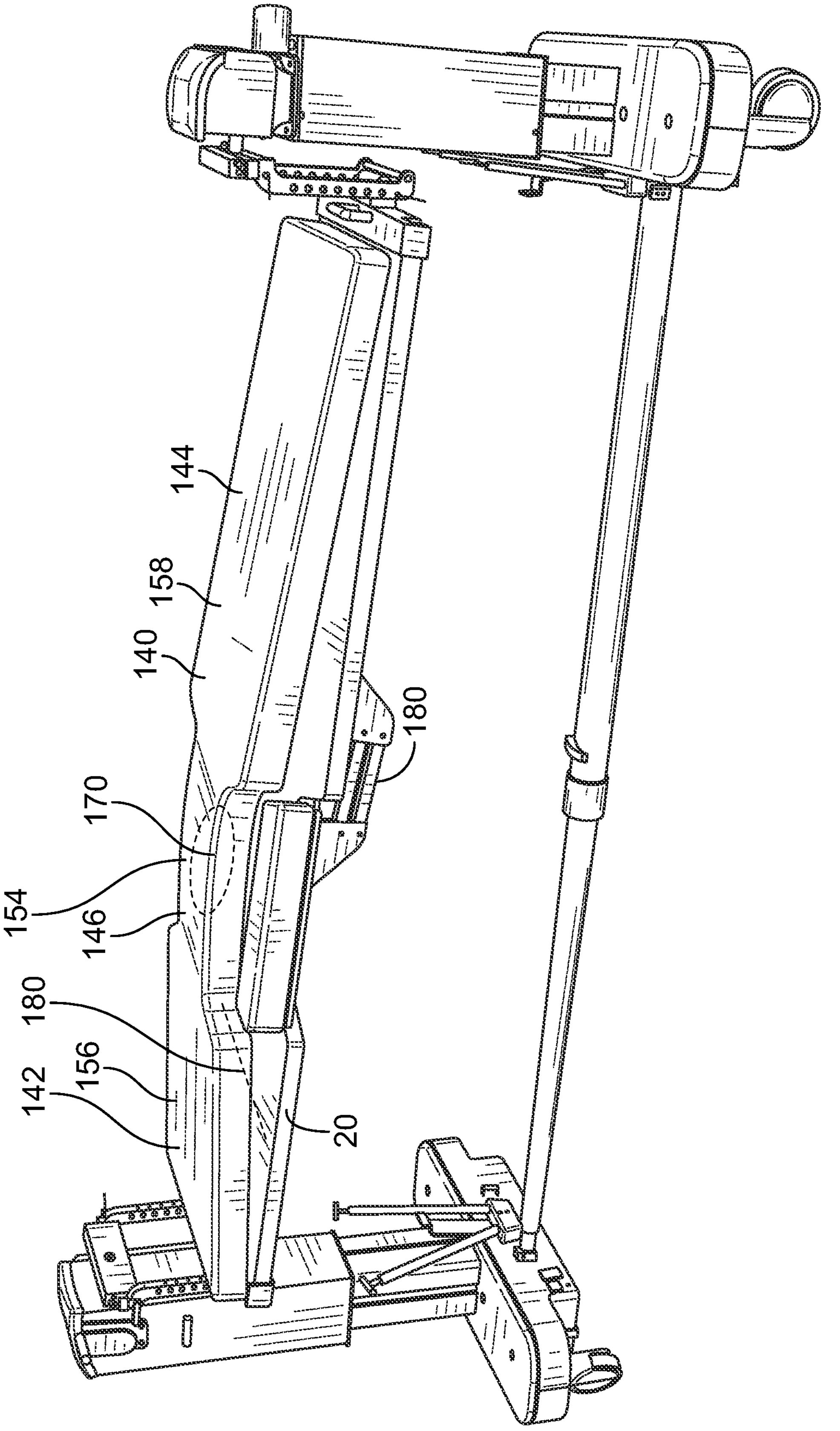
FIG. 4 is a perspective view of the surgical table shown in FIG. 1 and having a torso section of a patient support surface raised at an angle relative to a head section and a leg section of the patient support surface.

Referring to FIG. 4, an actuator 170 is positioned below the torso section 146 of the patient support surface 140. The actuator 170 is positioned between the patient support surface 140 and the table top 20. In some embodiments, the actuator 170 is an inflatable bladder. It will be appreciated that other forms of actuators may be included, such as a cam mechanism. The actuator 170 is configured to move the torso section 146 of the patient support surface 140 between a lowered position, shown in FIG. 1, and a raised position, shown in FIG. 4. The actuator 170 may also move the torso section 146 of the patient support surface 140 to a position between the lowered position and the raised position. The actuator 170 raises the torso section 146 of the patient support surface 140 so that the top surface 154 of the torso section 146 is at angle of up to and including 15 degrees relative to the top surface 156 of the head section 142 and the top surface 158 of the leg section 144. In the raised position, a slope 180 is formed in the patient support surface 140 between the head section 142 and the leg section 144. Notably, when the torso section 146 is in the raised position, the side member pads 150 are not moved, but rather, remain stationary. The torso section 146 may be raised or lowered to position a spine of a patient in an appropriate position for a surgical procedure.

Figure 6:
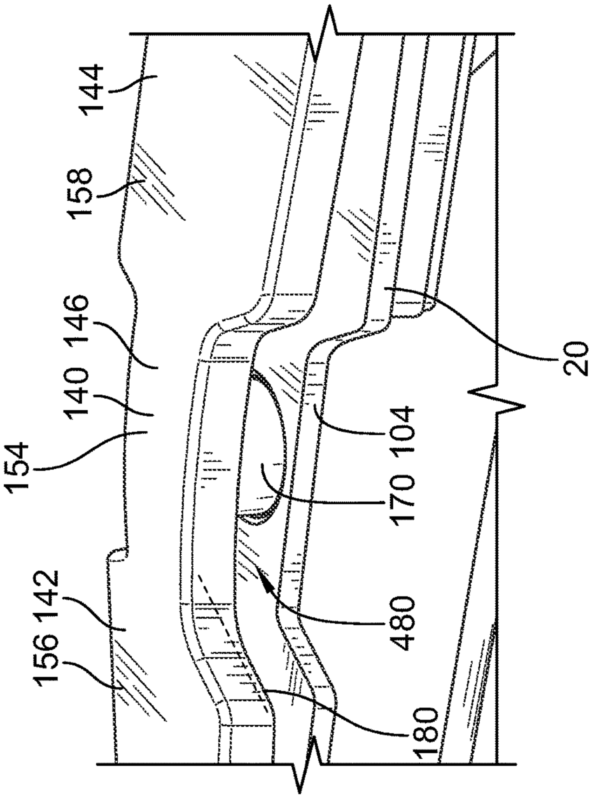
FIG. 6 is a perspective view of the torso section shown in FIG. 5, wherein an actuator has raised the torso section to a raised position.
Figure 5:
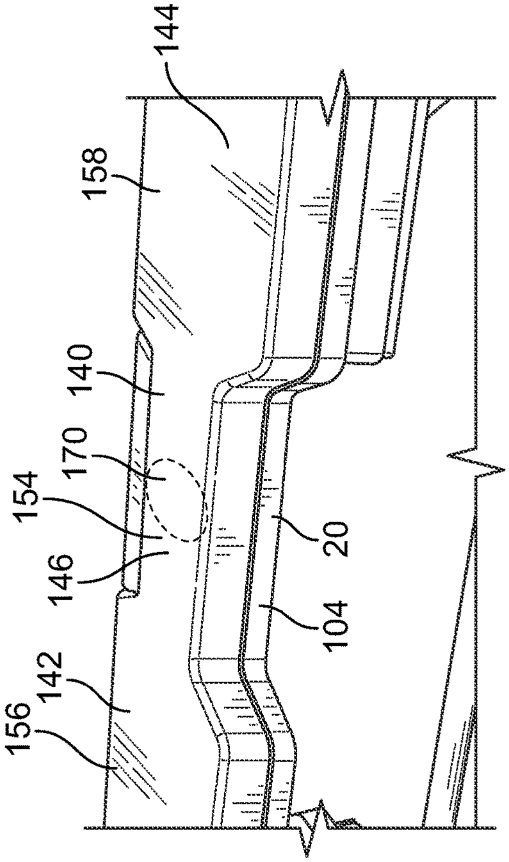
FIG. 5 is a perspective of the torso section of the surgical table shown in FIG. 1, wherein the torso section is in a lowered position.

FIGS. 5 and 6 illustrate operation of the actuator 170. It should be noted that FIGS. 5 and 6 illustrate the side members 112 in a stowed position (described in FIG. 7); however, the actuator 170 may be operated with the side members 112 in any position. The actuator 170 is positioned between the torso section 146 of the patient support surface 140 and the torso section 104 of the table top 20. In a lowered position, shown in FIG. 5, the top surface 154 of the torso section 146 of the patient support surface 140 is substantially flush with the top surface 156 of the head section 142 and the top surface 158 of the leg section 144 of the patient support surface 140. In a raised position, shown in FIG. 6, the torso section 146 of the patient support surface 140 is lifted off of the table top 20 by the actuator 170. Accordingly, a space 480 is created between the torso section 146 of the patient support surface 140 and the table top 20. The raised actuator 170 is positioned with the space 480.

The actuator 170 may be configured to raise the torso section 146 of the patient support surface 140 to any intermediate position between the lowered position and the raised position. The actuator 170 raises the torso section 146 of the patient support surface 140 so that the top surface 154 of the torso section 146 is at angle of up to and including 15 degrees relative to the top surface 156 of the head section 142 and the top surface 158 of the leg section 144. In the raised position, or any intermediate position, the slope 180 is formed in the patient support surface 140 between the head section 142 and the leg section 144. The angle of the slope 180 is dependent on the degree to which the actuator 170 raises the torso section 146 of the patient support surface 140.

Figure 7:
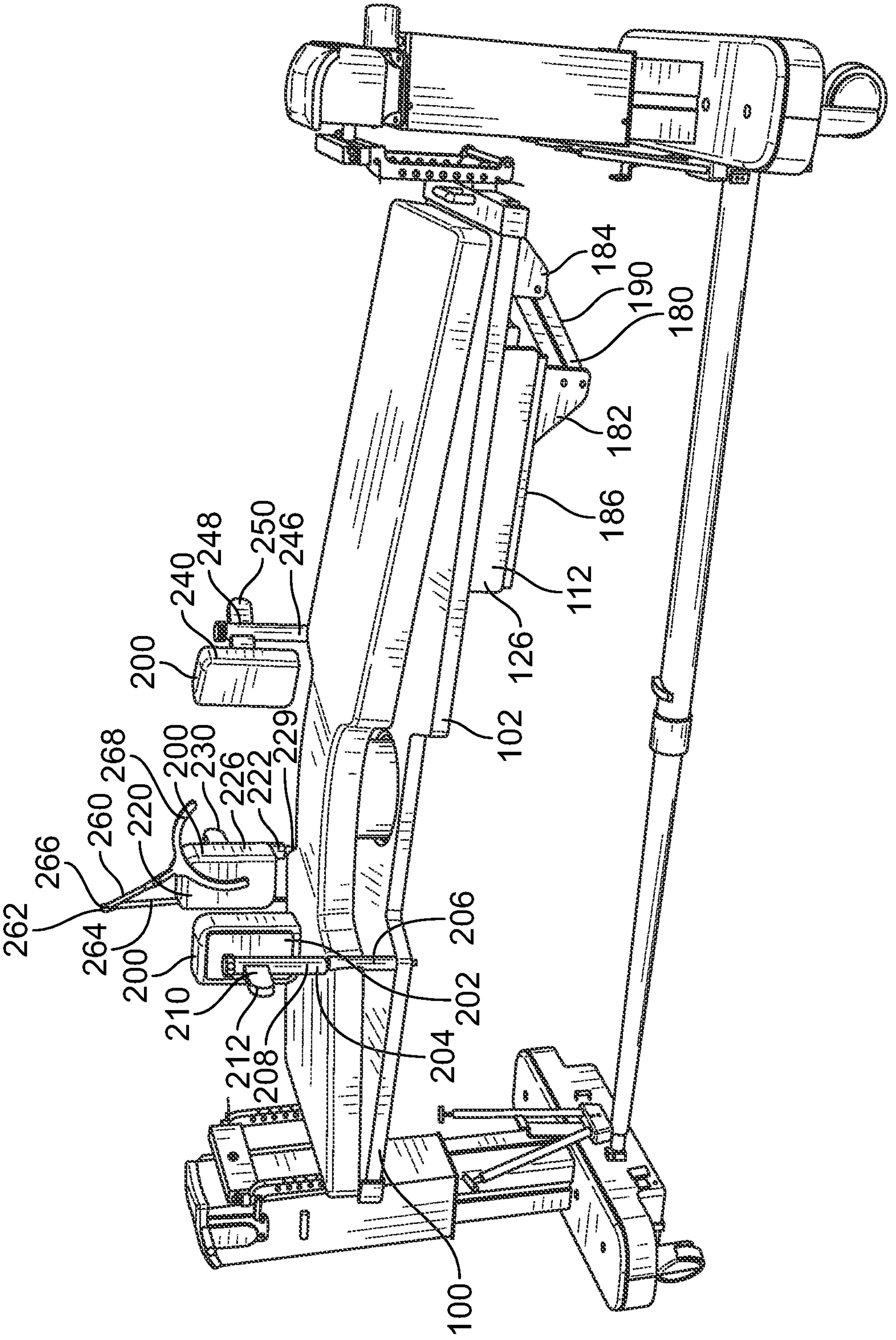
FIG. 7 is a perspective view of the surgical table shown in FIG. 1 and having side members of a torso section of the patient support surface moved to a stowed position, wherein FIG. 7 also illustrates a plurality of retention pads extending from the table top to retain the patient on the patient support surface.

Referring now to FIG. 7, the side members 112 are illustrated in a stowed position that enables access to a surgical site of the patient. The side members 112 are coupled to an articulating assembly 180 that moves the side members 112 from the extended position to the stowed position, as described in more detail below. The articulating assembly 180 includes a side member bracket 182 and a sliding bracket 184. The side member bracket 182 is coupled to an underside 186 of the side member 110. The sliding bracket 184 is coupled to a track 188 (shown in more detail in FIG. 12). At least one articulating arm 190 extends between the side member bracket 182 and the sliding bracket 184. The articulating arm 190 rotates about both the side member bracket 182 and the sliding bracket 184 to lower the side member 112 from the notch 120 in the center member 110. With the side member 112 lowered, the sliding bracket 184 moves along the track 188 to position the side member 112 is the stowed position below the leg section 102 of the table top 20.

The surgical table 10 may include two articulating assemblies 180, wherein each of the articulating assemblies 180 is coupled to one of the left side member 126 and the right side member 128. In this way, each of the left side member 126 and the right side member 128 may be individually moved to the stowed position. In some embodiments, the two articulating assemblies 180 may be joined. For example, the two articulating assemblies 180 may share a common sliding bracket 184 and track 188. Accordingly, the two articulating assemblies 180 may work in unison to move the left side member 126 and the right side member 128 to the stowed position in unison. The articulating assembly 180 may be manually operated by a technician or caregiver. In some embodiments, the articulating assembly 180 may be operable by a controller (not shown).

Figure 8:
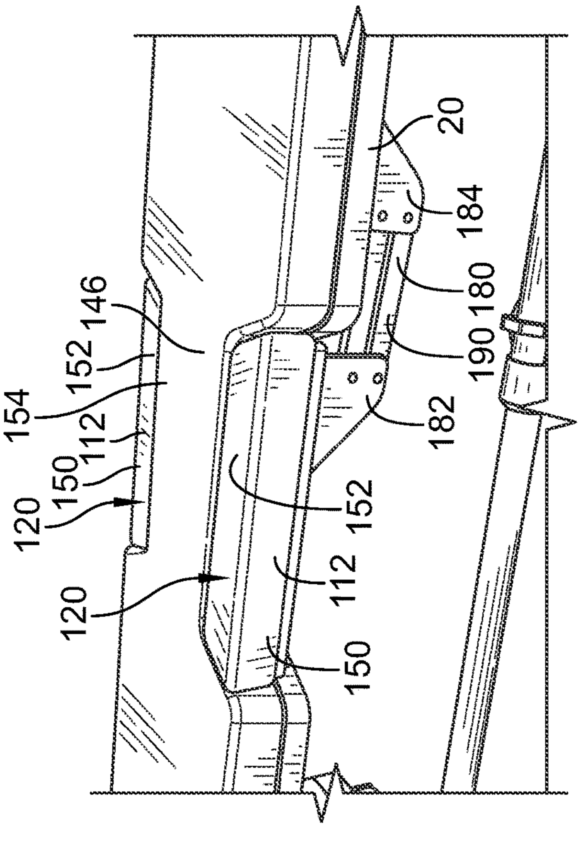
FIG. 8 is a perspective view of the side members of the surgical table shown in FIG. 1 in an extended position.

FIGS. 8-12 illustrate movement of the side members 112 from the extended position to the stowed position. FIG. 8 shows the side members 112 in the extended position. In the extended position, the side members 112 are positioned with the respective notch 120 formed in the center member 110. In the extended position, the top surface 152 of each side member pad 150 is substantially flush with the top surface 154 of the torso section 146 of the patient support surface 140. Additionally, the top surface 152 of each side member pad 150 is substantially flush with the top surface 156 of the head section 142 of the patient support surface 140 and the top surface 158 of the leg section 144 of the patient support surface 140. Moreover, in the extended position, the articulating arm 190 of the articulating assembly 180 extends substantially parallel to the table top 20 between the side member bracket 182 and the sliding bracket 184.

Figure 9:
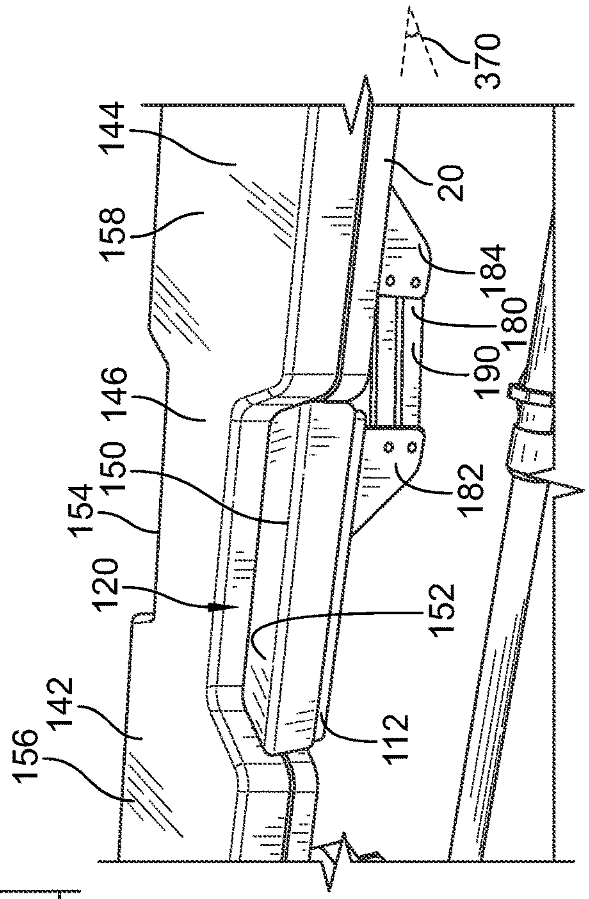
FIG. 9 is a perspective view of the side members of the surgical table shown in FIG. 1 in an intermediate position.

Referring to FIG. 9, the articulating arm 190 rotates about both the side member bracket 182 and the sliding bracket 184 to lower the side member 112 from the notch 120 to an intermediate position. In the intermediate position, the articulating arm 190 is positioned at an angle 370 relative to the table top 20. In the intermediate position shown in FIG. 9, the top surface 152 of each side member pad 150 is no longer substantially flush with the top surface 154 of the torso section 146 of the patient support surface 140. Rather, the top surface 152 of each side member pad 150 is positioned below the top surface 154 of the torso section 146 of the patient support surface 140. Additionally, the top surface 152 of each side member pad 150 is no longer substantially flush with the top surface 156 of the head section 142 of the patient support surface 140 and the top surface 158 of the leg section 144 of the patient support surface 140. Rather, the top surface 152 of each side member pad 150 is positioned below the top surface 156 of the head section 142 of the patient support surface 140 and the top surface 158 of the leg section 144 of the patient support surface 140. In the intermediate position, the side member pad 150 is still positioned above the table top 20.

Figure 11:
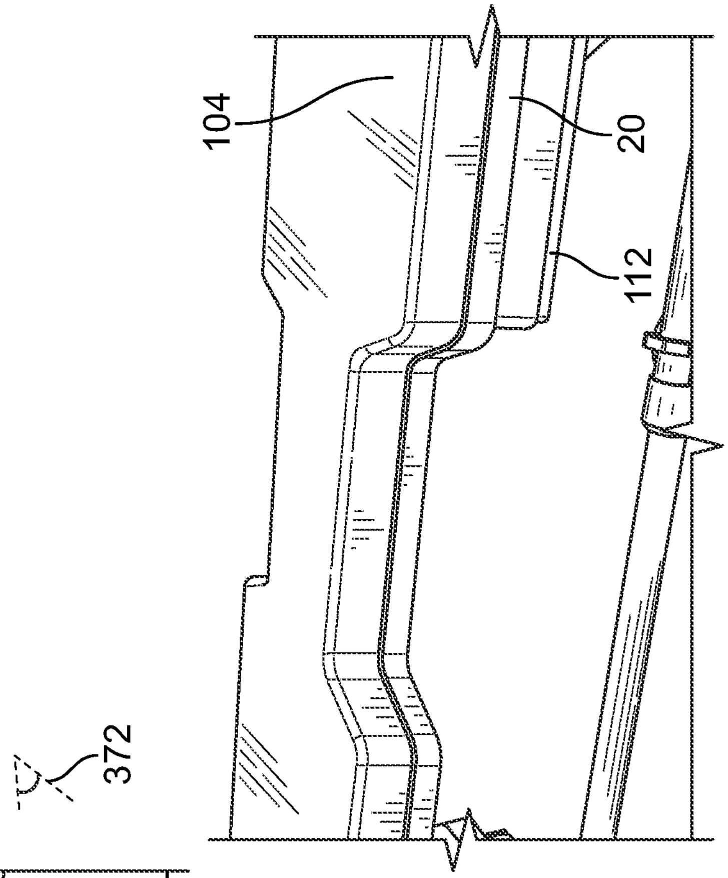
FIG. 11 is a perspective view of the side members of the surgical table shown in FIG. 1 in a stowed position.
Figure 10:
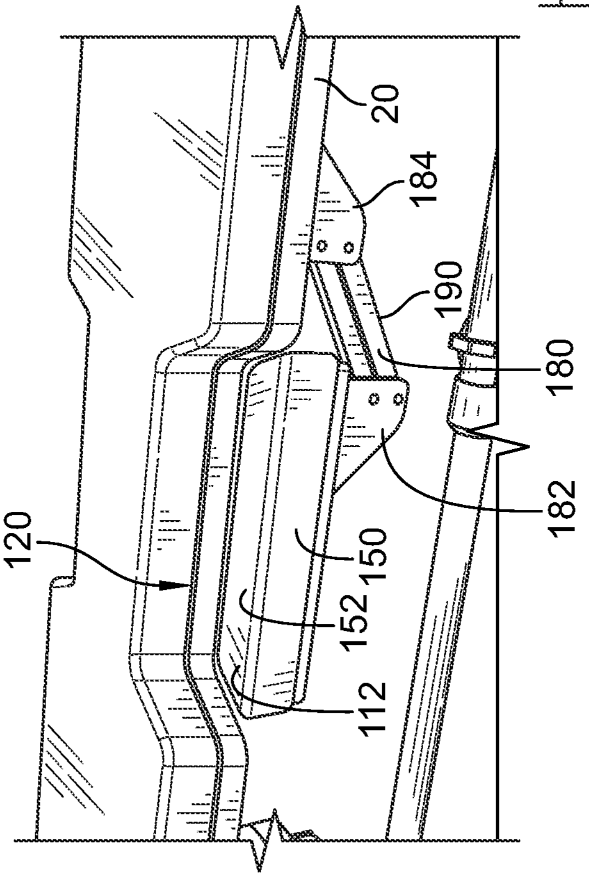
FIG. 10 is a perspective view of the side members of the surgical table shown in FIG. 1 in a lowered position.

Referring to FIG. 10, the articulating arm 190 further rotates about both the side member bracket 182 and the sliding bracket 184 to lower the side member 112 from the notch 120 to a lowered position. In the lowered position, the articulating arm 190 is positioned at an angle 372 relative to the table top 20. The angle 372 is greater than the angle 370. In the lowered position shown in FIG. 10, the top surface 152 of each side member pad 150 is positioned below the table top 20. In the lowered position, the side members 112 are capable of being slid below the leg section 102 of the table top 20. Referring to FIG. 11, the sliding bracket 184 is moved along the track 188 (shown in FIG. 11) to move the side members 112 into the stowed position. In the stowed position, the side members 112 are positioned below the leg section 104 of the table top 20.

Figures 12, 13:
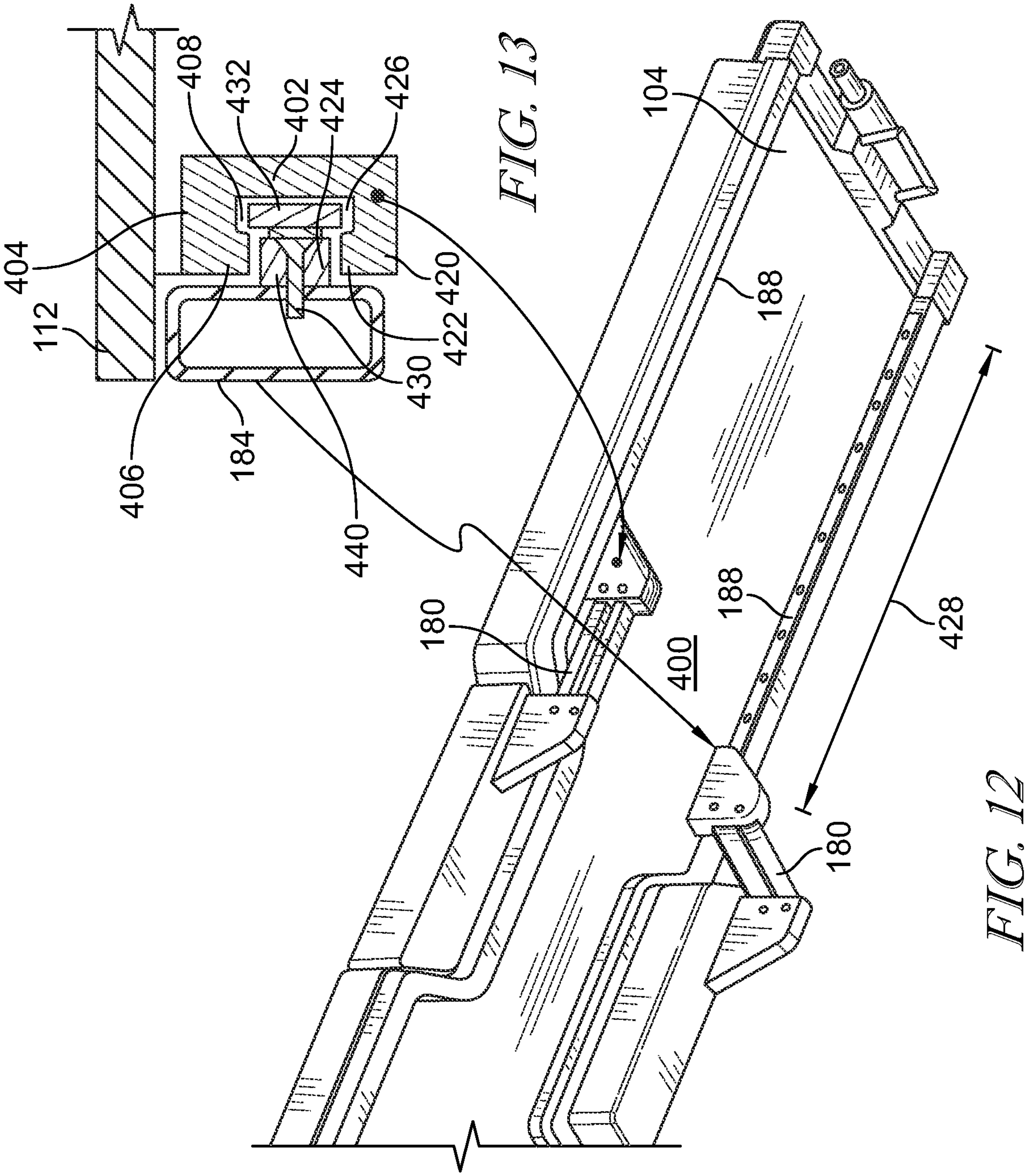
FIG. 12 is a perspective view of a track of an articulating assembly that extends under the leg section of the surgical table shown in FIG. 1 and is configured to move the side members between the extended position and the stowed position.
FIG. 13 is a cross-sectional view of the track shown in FIG. 12.

Referring now to FIGS. 12 and 13, a track 188 extends along an underside 400 of each side of the leg section 102. Each track 188 includes a base rail 402 that extends along a length 428 of the track 188. An upper rail 404 extends from the base rail 402. The upper rail 404 includes a downwardly extending flange 406. An upper notch 408 is defined between the downwardly extending flange 406, the upper rail 404, and the base rail 402. The upper notch 408 extends along the length 428 of the track 188. A lower rail 420 also extends from the base rail 402. The lower rail 420 includes an upwardly extending flange 422. The upwardly extending flange 422 extends toward the downwardly extending flange 406 so that a slot 424 is defined between the upwardly extending flange 422 and the downwardly extending flange 406. The slot 424 extends along the length 428 of the track 188. A lower notch 426 is defined between the upwardly extending flange 422, the lower rail 420, and the base rail 402. The lower notch 426 extends along the length 428 of the track 188. The lower notch 426 is positioned opposite the upper notch 408.

The sliding bracket 184 is positioned adjacent the track 188. A pin 430 extends from the sliding bracket 184 through the slot 424. A roller 432 is coupled to an end of the pin 430. The roller 432 is sized to position between the upper rail 404 and the lower rail 420. The roller 432 extends into the upper notch 408 and the lower notch 426. The downwardly extending flange 406 and the upwardly extending flange 422 retain the roller 432 between the upper rail 404 and the lower rail 420. The roller 432 is configured to roll along the track 188, e.g. along the upper rail 404 and the lower rail 420 along the length 428 of the track 188. Another roller 440 is positioned around the pin 430 between the roller 432 and the sliding bracket 184. The roller 440 is positioned in the slot 424 between the downwardly extending flange 406 and the upwardly extending flange 422. The roller 440 is retained between the downwardly extending flange 406 and the upwardly extending flange 422 and configured to move along the track 188 along the length 428 of the track 188.

When the side member 112 is moved to the lowered position, the side member 112 is capable of translating along the track 188 by rolling the sliding bracket 184 along the length 428 of the track 188 to the stowed position. A stopper 450, for example, a rubber stopper or the like, is positioned at an end 452 of the track 188. The stopper 450 is positioned between the upper rail 404 and the lower rail 420 to prevent movement of the roller 432. The stopper 450 is positioned to stop movement of the sliding bracket 184 at the stowed position.

Figure 15:
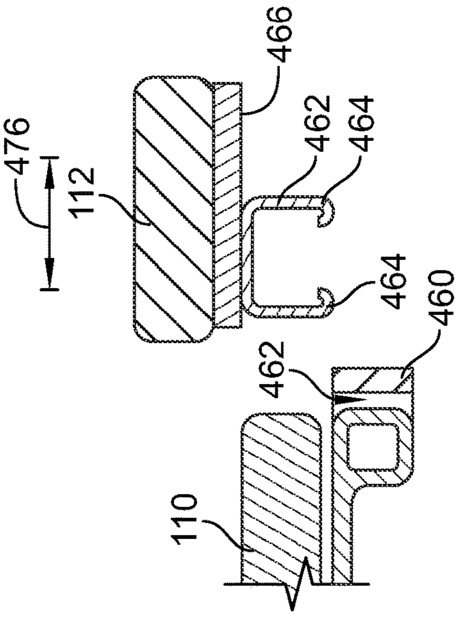
FIG. 15 is a cross-sectional view of the slots and clip shown in FIG. 14.
Figure 14:
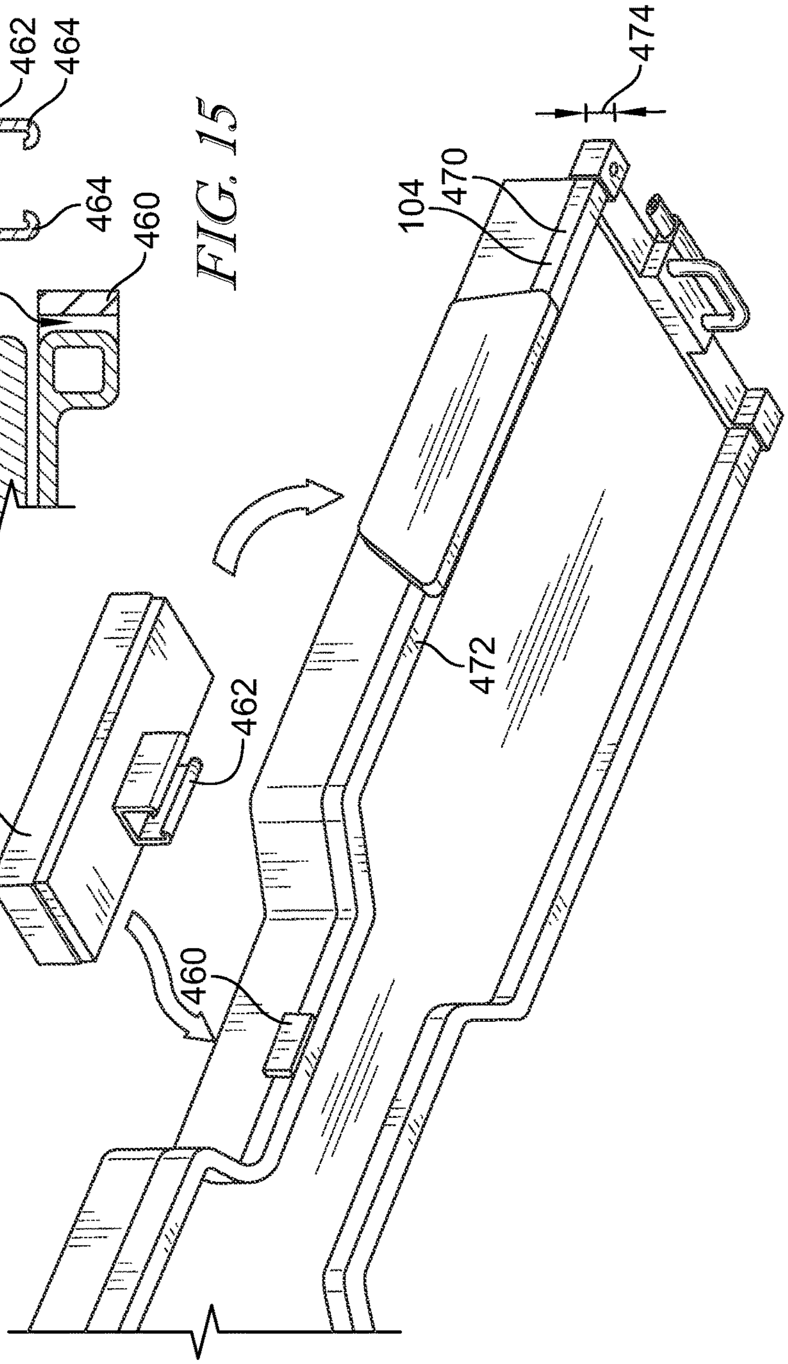
FIG. 14 is a perspective view of an alternative embodiment of the surgical table shown in FIG. 1 having slots on the center member of the torso section and clips on the side members of the torso section.

Referring to FIGS. 14 and 15, another embodiment for moving the side members 112 to a stowed position is illustrated. A bracket 460 is coupled to a side of the center member 110. The bracket 460 defines an upwardly facing slot 462. A clip 462 having a pair of flanges 464 extends from a bottom 466 of each side member 112. To position the side member 112 adjacent the center member 110, a one of the flanges 464 of the clip 462 is inserted into the upwardly facing slot 462. The upwardly facing slot 462 is sized to retain the flange 464 of the clip 462 so that the side member 112 is firmly held in place adjacent the center member 110.

To move the side member 112 to the stowed position, the side member 112 is removed from adjacent the center member 110 by lifting the flange 464 from the slot 462. The side member 112 may then be clipped along any position of a side 470 of the leg section 102. That is, the leg section 102 includes a frame 472 having a width 474. A distance 476 between the flanges 464 of the clip 462 is sized to the width 474 of the frame 472. Accordingly, the clip 462 is secured to the frame 472 to position the side member 112 in the stowed position on the leg section 102.

Figure 16:
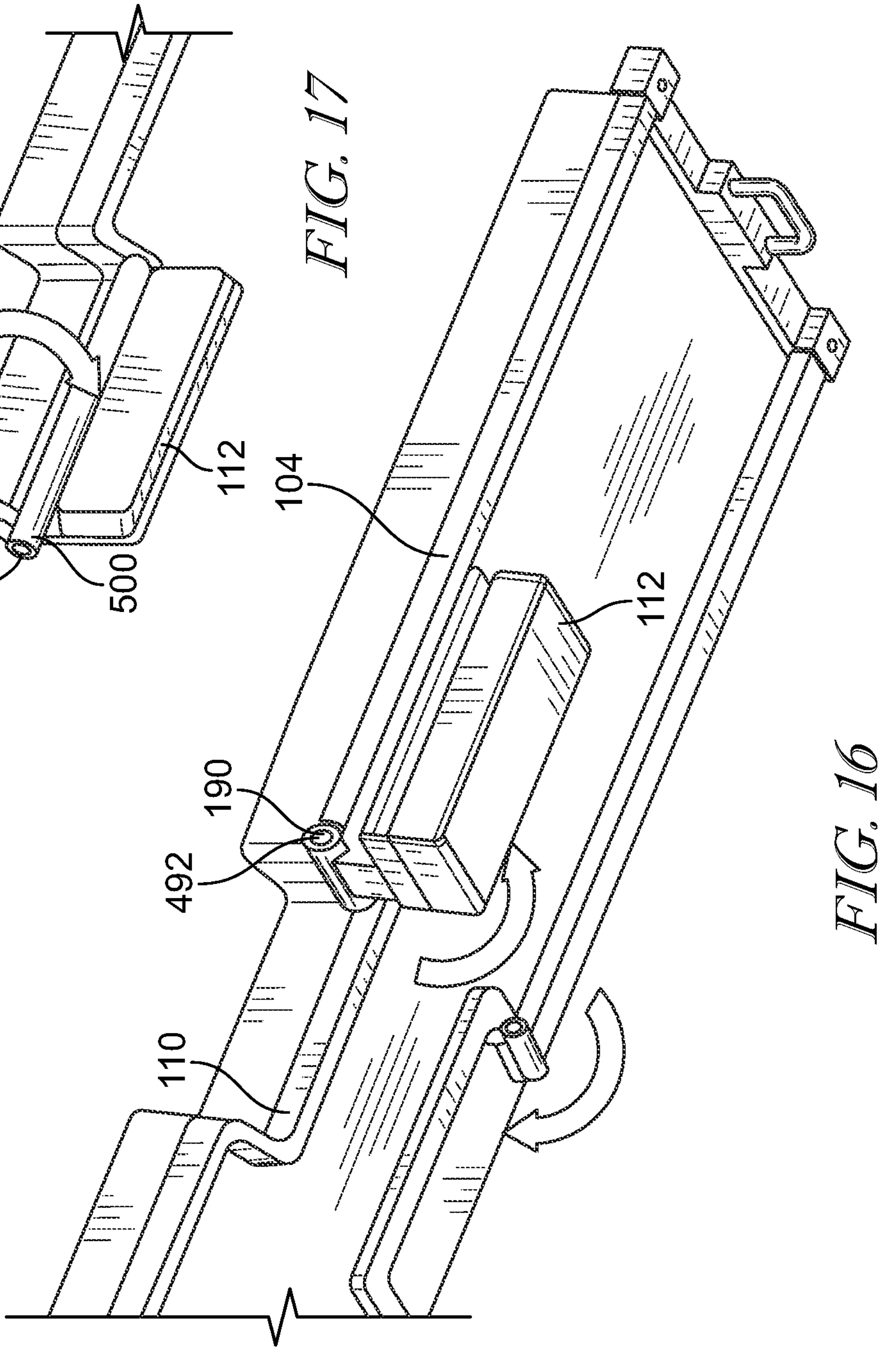
FIG. 16 is a perspective view of another alternative embodiment of the surgical table shown in FIG. 1 having hingedly attached side members.

Referring to FIG. 16, another embodiment for stowing the side member 112 is illustrated. A hinge 490 couples the side member 112 to the leg section 102. The hinge 490 includes a release button 492 that actuates the hinge between a locked configuration and an unlocked configuration. To position the side member 112 adjacent the center member 110, the side member 112 is rotated about the hinge 490 to a locked position, wherein the side member 112 is raised. In this position, a locking mechanism of the hinge 490 retains the side member 112 adjacent the center member 110. To stow the side member 112, the release button 492 is actuated to unlock the side member 112 causing the side member 112 to drop downward. The side member 112 is then locked into position under the leg section 102. The locking mechanism of the hinge 490 is configured to retain the side member 112 is the stowed position.

Figure 17:
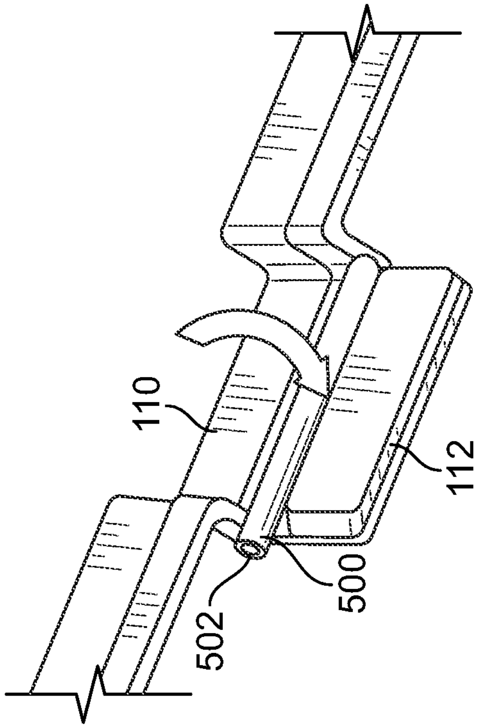
FIG. 17 is a perspective view of yet another alternative embodiment of the surgical table shown in FIG. 1 having hingedly attached side members.

Referring now to FIG. 17, another embodiment for stowing the side member 112 is illustrated. A hinge 500 couples the side member 112 to the center member 110. The hinge 500 includes a release button 502 that actuates the hinge between a locked configuration and an unlocked configuration. To position the side member 112 adjacent the center member 110, the side member 112 is rotated about the hinge 500 to a locked position, wherein the side member 112 is raised. In this position, a locking mechanism of the hinge 500 retains the side member 112 adjacent the center member 110. To stow the side member 112, the release button 502 is actuated to unlock the side member 112 causing the side member 112 to drop downward. The side member 112 is then locked into position under the center member 110. The locking mechanism of the hinge 500 is configured to retain the side member 112 is the stowed position.

Figure 18:
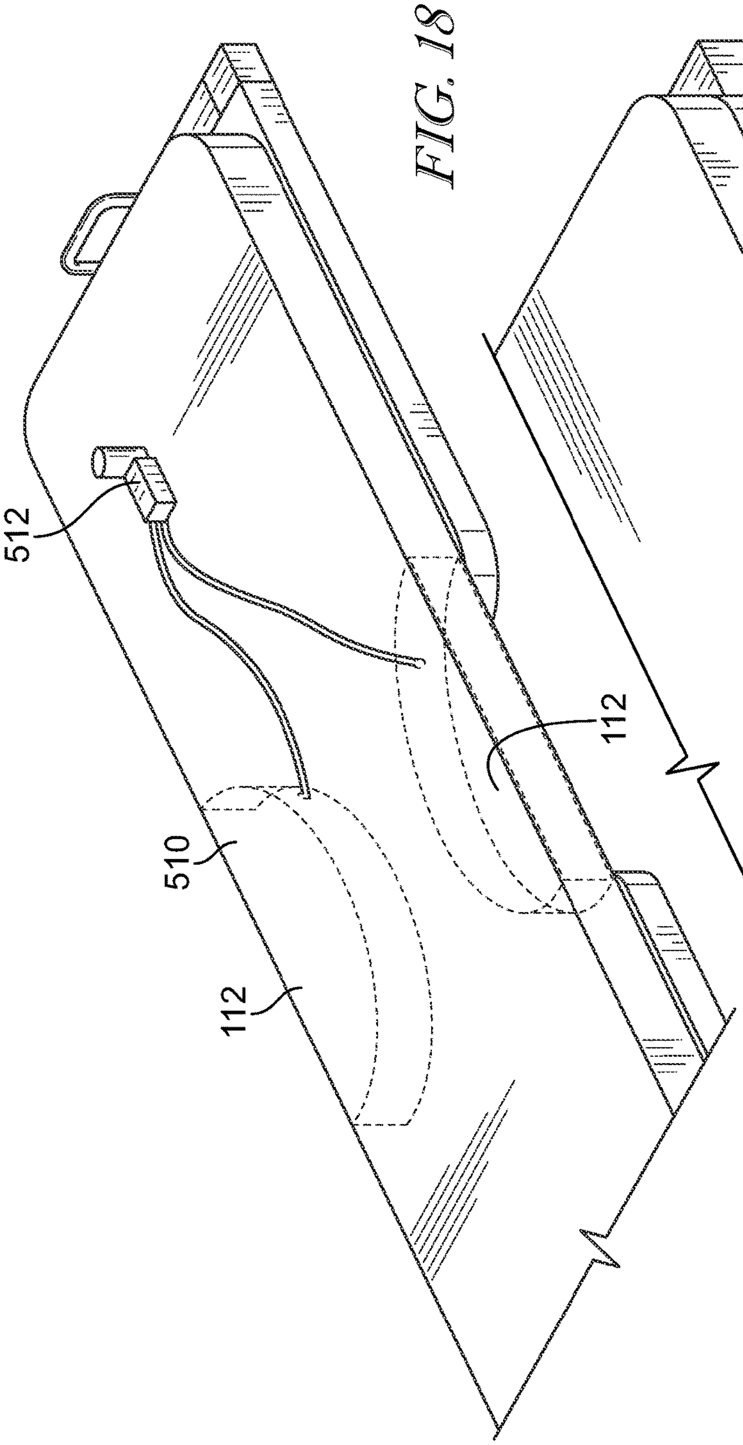
FIG. 18 is a perspective view of another alternative embodiment of the surgical table shown in FIG. 1 having inflatable side members in an inflated configuration.
Figure 19:
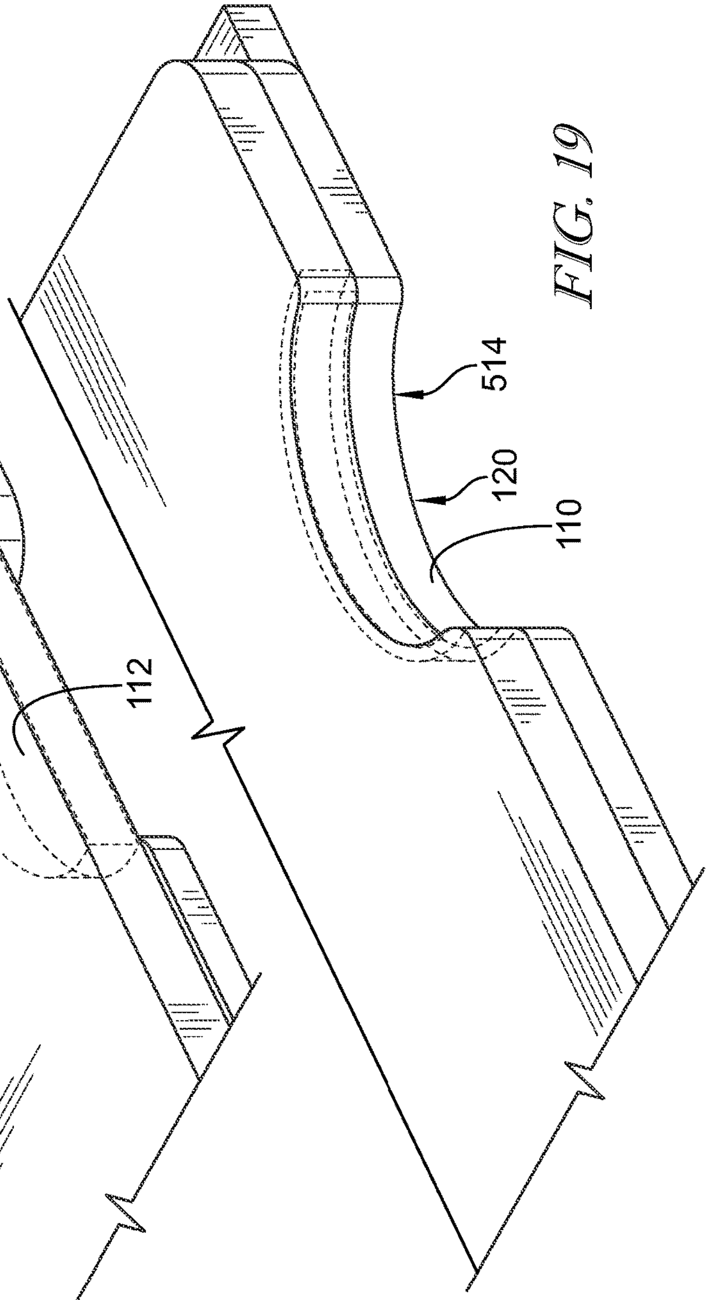
FIG. 19 is a perspective view of another alternative embodiment of the surgical table shown in FIG. 1 having inflatable side members in a deflated configuration.

Referring to FIGS. 18-19, another embodiment for stowing the side member 112 is illustrated. The side member 112 includes an inflatable bladder 510 fluidly coupled to a pump 512. As illustrated in FIG. 18, when the inflatable bladder 510 is fully inflated, the side member 112 is inflated to fill the respective notch 120 so that the side member 112 is positioned adjacent the center member 110. As illustrated in FIG. 19, the side member 112 is stowed by deflating the inflatable bladder 510 so that a void 514 is created in the notch 120.

Referring back to FIG. 7, the surgical table 10 includes a plurality of retention pads 200 to secure the patient to the table top 20. A chest retention pad 202 is configured to position against a chest of a patient positioned on the table top 20. A chest retention post 204 extends vertically from the head section 100 of the table top 20. The chest retention post 204 includes an lower post 206 coupled to the head section 100 and a upper post 208 telescopically coupled to the lower post 206. Accordingly, the upper post 208 may be raised and lowered relative to the head section 100, as described in more detail below. The upper post 208 includes a slot 210 that receives a chest retention arm 212. The chest retention arm 212 extends horizontally from the chest retention post 204 and is configured to move relative to the upper post 208, as described in more detail below. The chest retention pad 202 is coupled to an end of the chest retention arm 212. The upper post 208 is configured to rotate relative to the lower post 206, as described in more detail below.

A back retention pad 220 is configured to position against a back of a patient positioned on the table top 20. A back retention post 222 extends vertically from the head section 100 of the table top 20. The back retention post 222 includes an lower post 224 coupled to the head section 100 and a upper post 226 telescopically coupled to the lower post 224. Accordingly, the upper post 226 may be raised and lowered relative to the head section 100, as described in more detail below. The upper post 226 includes a slot (not shown) that receives a back retention arm 230. The back retention arm 230 extends horizontally from the back retention post 222 and is configured to move relative to the upper post 226, as described in more detail below. The back retention pad 220 is coupled to an end of the back retention arm 230. The upper post 226 is configured to rotate relative to the lower post 224, as described in more detail below.

A thigh retention pad 240 is configured to position against a thigh of a patient positioned on the table top 20. A thigh retention post 242 extends vertically from the leg section 102 of the table top 20. The thigh retention post 242 includes an lower post (not shown) coupled to the leg section 102 and a upper post 246 telescopically coupled to the lower post 244. Accordingly, the upper post 246 may be raised and lowered relative to the leg section 102, as described in more detail below. The upper post 246 includes a slot 248 that receives a thigh retention arm 250. The thigh retention arm 250 extends horizontally from the thigh retention post 242 and is configured to move relative to the upper post 246, as described in more detail below. The thigh retention pad 240 is coupled to an end of the thigh retention arm 250. The upper post 246 is configured to rotate relative to the lower post 244, as described in more detail below.

Figure 20:
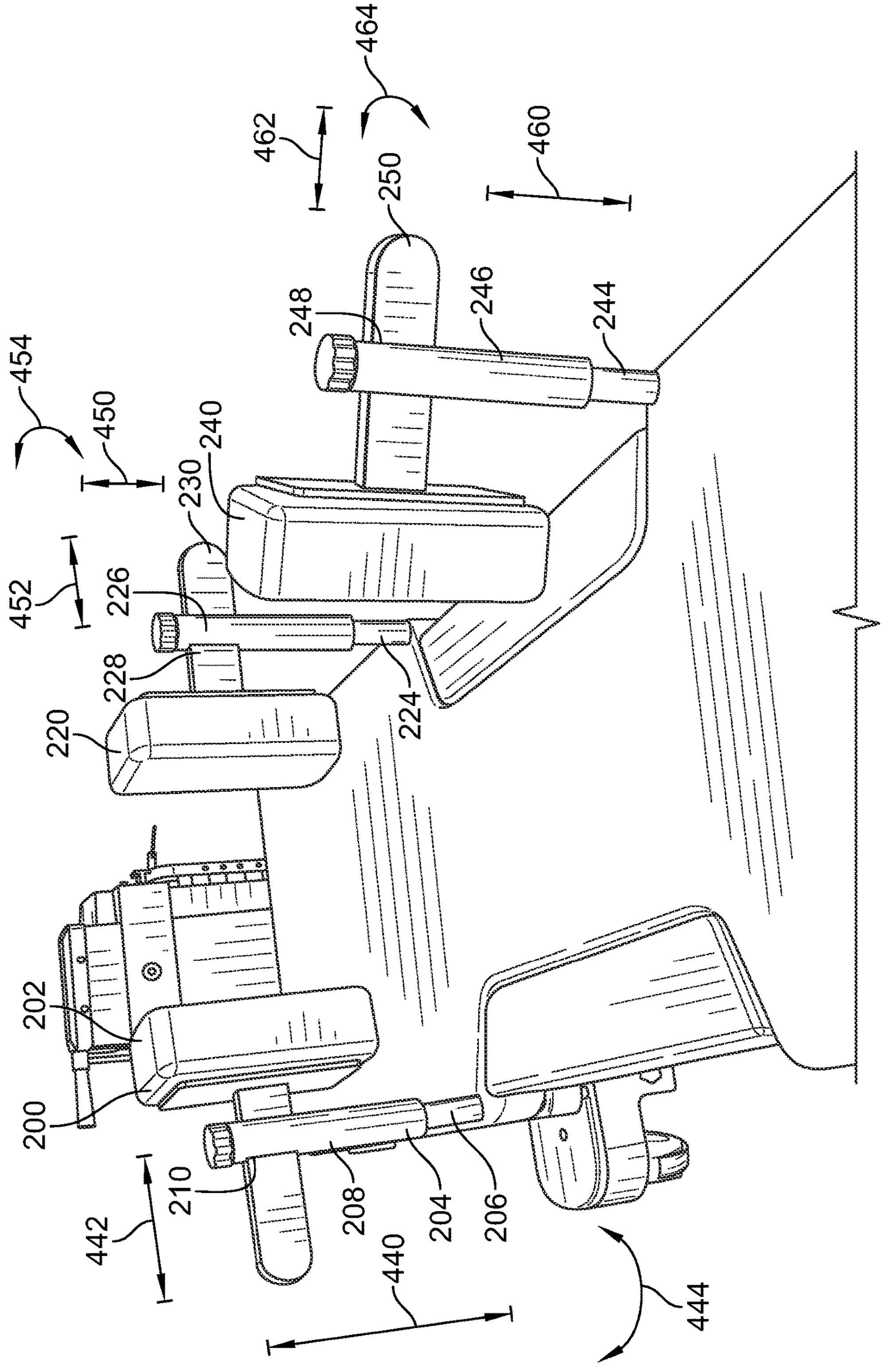
FIG. 20 is a perspective view of the retention pads of the surgical table shown in FIG. 1, wherein movement of each of the retention pads is illustrated.

Referring to FIG. 20, articulation of the retention pads 200 is illustrated. For example, the chest retention pad 202 may be raised or lowered in the direction 440 by telescopically raising and lowering the upper post 208 of the chest retention post 204 relative to the lower post 206. The height of the chest retention pad 202 is selected based on a size of the patient 280 for patient comfort. Additionally, the chest retention pad 202 may be horizontally moved in the direction 442 by sliding the chest retention arm 212 through the slot 210 in the upper post 208 of the chest retention post 204. The horizontal location of the chest retention pad 202 is selected based on a size of the patient 280 for patient comfort. Moreover, an angle of the chest retention pad 202 may be adjusted by rotating the upper post 208 of the chest retention post 204 relative to the lower post 206 of the chest retention post 204 in the direction 444. The angle of the chest retention pad 202 is selected based on a size of the patient 280 for patient comfort.

The back retention pad 220 may be raised or lowered in the direction 450 by telescopically raising and lowering the upper post 226 of the back retention post 222 relative to the lower post 224. The height of the back retention pad 220 is selected based on a size of the patient 280 for patient comfort. Additionally, the back retention pad 220 may be horizontally moved in the direction 452 by sliding the back retention arm 230 through the slot 228 in the upper post 226 of the back retention post 222. The horizontal location of the back retention pad 220 is selected based on a size of the patient 280 for patient comfort. Moreover, an angle of the back retention pad 220 may be adjusted by rotating the upper post 226 of the back retention post 222 relative to the lower post 224 of the back retention post 222 in the direction 454. The angle of the back retention pad 220 is selected based on a size of the patient 280 for patient comfort.

The thigh retention pad 240 may be raised or lowered in the direction 460 by telescopically raising and lowering the upper post 246 of the thigh retention post 242 relative to the lower post 244. The height of the thigh retention pad 240 is selected based on a size of the patient 280 for patient comfort. Additionally, the thigh retention pad 240 may be horizontally moved in the direction 462 by sliding the thigh retention arm 250 through the slot 248 in the upper post 246 of the thigh retention post 242. The horizontal location of the thigh retention pad 240 is selected based on a size of the patient 280 for patient comfort. Moreover, an angle of the thigh retention pad 240 may be adjusted by rotating the upper post 246 of the thigh retention post 242 relative to the lower post 244 of the back retention post 242 in the direction 464. The angle of the thigh retention pad 240 is selected based on a size of the patient 280 for patient comfort.

Figure 21:
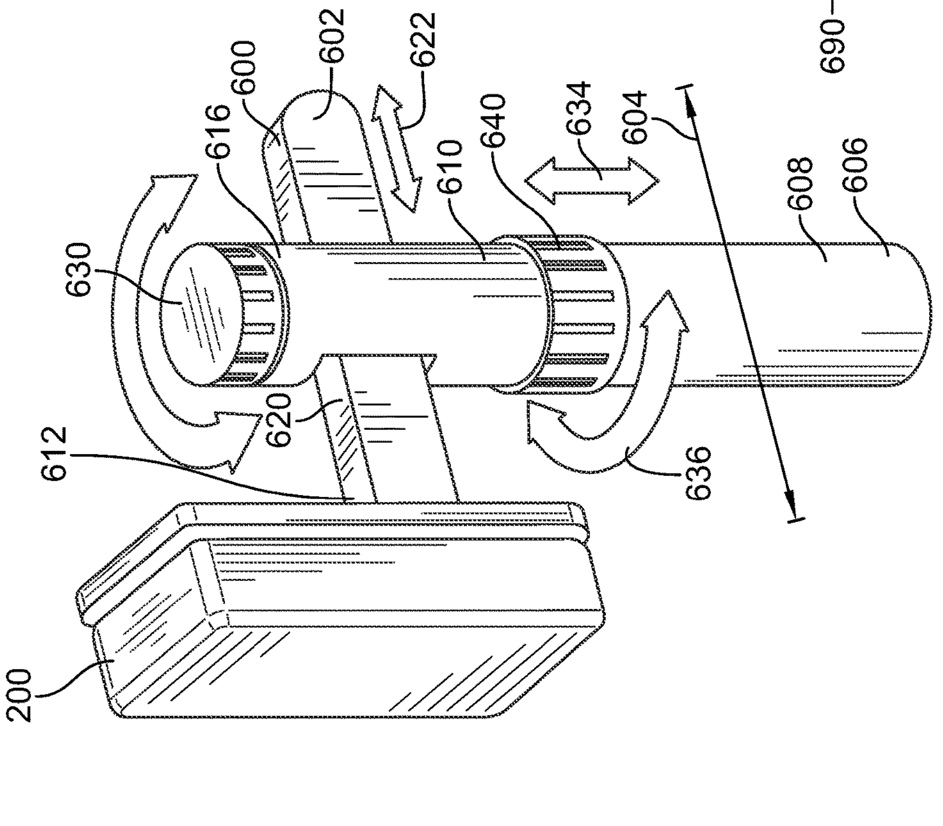
FIG. 21 is another perspective view of the retention pads of the surgical table shown in FIG. 1, wherein movement of each of the retention pads is illustrated.

Referring now to FIG. 21, each retention pad 200 is positioned at an end 612 of a retention blade 600. The retention blade 600 include two opposite flat surfaces 602 that extend a length 604 of the blade 600. The retention blade 600 is coupled to a retention post 606 that includes a lower post 608 and an upper post 610 extending from the lower post 608. The retention blade 600 extends through a slot 620 formed in the upper post 610. The retention blade 600 is configured to move horizontally along arrow 622 through the slot 620 to adjust a position of the retention pad 200. A screw 630 (described in more detail below) positioned at an upper end 616 of the upper post 610 is movable between a locked position and an unlocked position. In the locked position, the screw 630 retains a position of the retention blade 600 relative to the upper post 610 of retention post 606. With the screw 630 in the unlocked position, the blade 600 is capable of moving freely about arrows 622.

The upper post 610 of the retention post 606 is configured to telescopically raise and lower vertically about arrow 634 relative to the lower post 608. The upper post 610 is raised an lower about arrow 634 to adjust a height of the retention pad 600. The upper post 610 is also configured to rotate about arrow 636 relative to the lower post 608 to adjust a rotational position of the retention pad 200. A screw 640 is positioned at a lower end 642 of the upper post 610 is moveable between a locked and unlocked position. In the locked position, the screw 640 prevents both rotational and vertical movement of the upper post 610 relative to the lower post 608. With the screw 640 in the unlocked position, the upper post 610 is capable of freely moving vertically about arrow 634 or rotationally about arrow 636.

Figure 22:
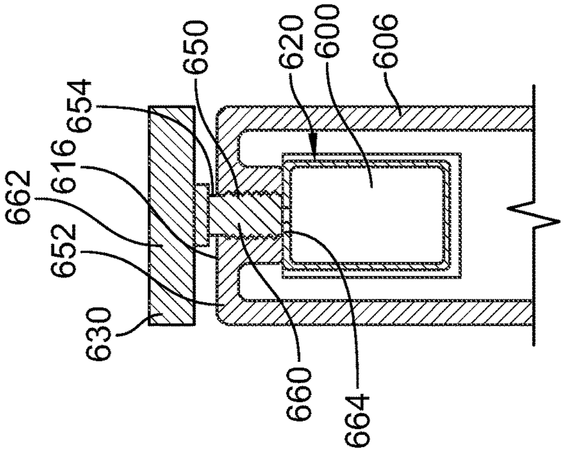
FIG. 22 is a perspective view of the retention pads of the surgical table shown in FIG. 1, wherein a locking mechanism of each of the retention pads is illustrated.

Referring to FIG. 22, the retention blade 600 extends through the slot 620 extending through the retention post 606. A threaded bore 650 extends from a top wall 652 defining the slot 620 through an opening 654 formed in the upper end 616 of the upper post 610. The screw 630 includes a threaded member 660 that extends through the bore 650 from a knob 662 to an end 664. A user can rotate the knob 662 to drive the threaded member 660 between the unlocked position and the locked position. In the unlocked position, the end 664 of the threaded member 660 is pulled away from the retention blade 600 and is not in contact with the retention blade 600. Accordingly, the retention blade 600 is capable of moving freely through the slot 620. In the locked position, the end 664 of the threaded member 660 is positioned in contact with the retention blade 600 to create a frictional force that prevents movement of the retention blade 600 through the slot 620.

Figure 23:
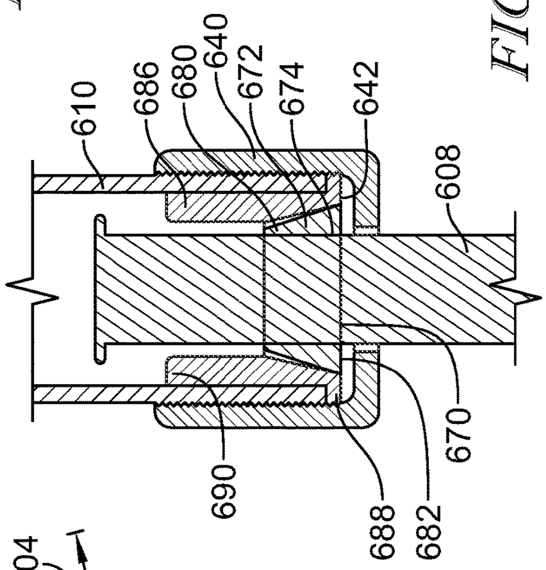
FIG. 23 is a perspective view of the retention pads of the surgical table shown in FIG. 1, wherein another locking mechanism of each of the retention pads is illustrated.

Referring now to FIG. 23, the lower post 608 extends through an opening 670 in the lower end 642 of the upper post 610 and into the upper post 610. A tapered sleeve 672 is positioned around an upper end 674 of the lower post 608. The tapered sleeve 672 tapers outward from a top end 680 to a lower end 682. Another tapered sleeve 686 is positioned adjacent the tapered sleeve 672. The tapered sleeve 686 tapers outward from a lower end 688 to an upper end 690. The screw 640 is movable by a user to tighten the tapered sleeve 686 onto the tapered sleeve 672, thereby tightening the tapered sleeve 672 onto the lower post 608. That is, with the screw 640 in the unlocked position, the upper post 610 is able to move freely relative to the lower post 608 in the vertical direction of arrow 634 and rotationally in the direction of arrow 636. With the screw in the locked position, the tapered sleeve 686 tightens the tapered sleeve 672 onto the lower post 608 to prevent both vertical and rotational movement of the upper post 610 relative to the lower post 608.

Referring back to FIG. 7, an articulating C-arm 260 extends from the head section 100 and is configured to position around the patient and against an abdomen of the patient. The articulating C-arm 260 includes a frame 262 formed from a plurality of arms 264 coupled at joints 266. The joints 266 enable each of the arms 264 to be positioned such that the frame 262 wraps around the patient from a posterior side of the patient to an anterior side of the patient. A brace 268 is coupled to an end of the frame 262. The brace 268 is generally semi-circular in shape and configured to position around the patient's abdomen. Accordingly, the articulating C-arm 260 is secured to the table top 20 on the posterior side of the patient and to the patient's abdomen on the anterior side of the patient.

Figure 24:
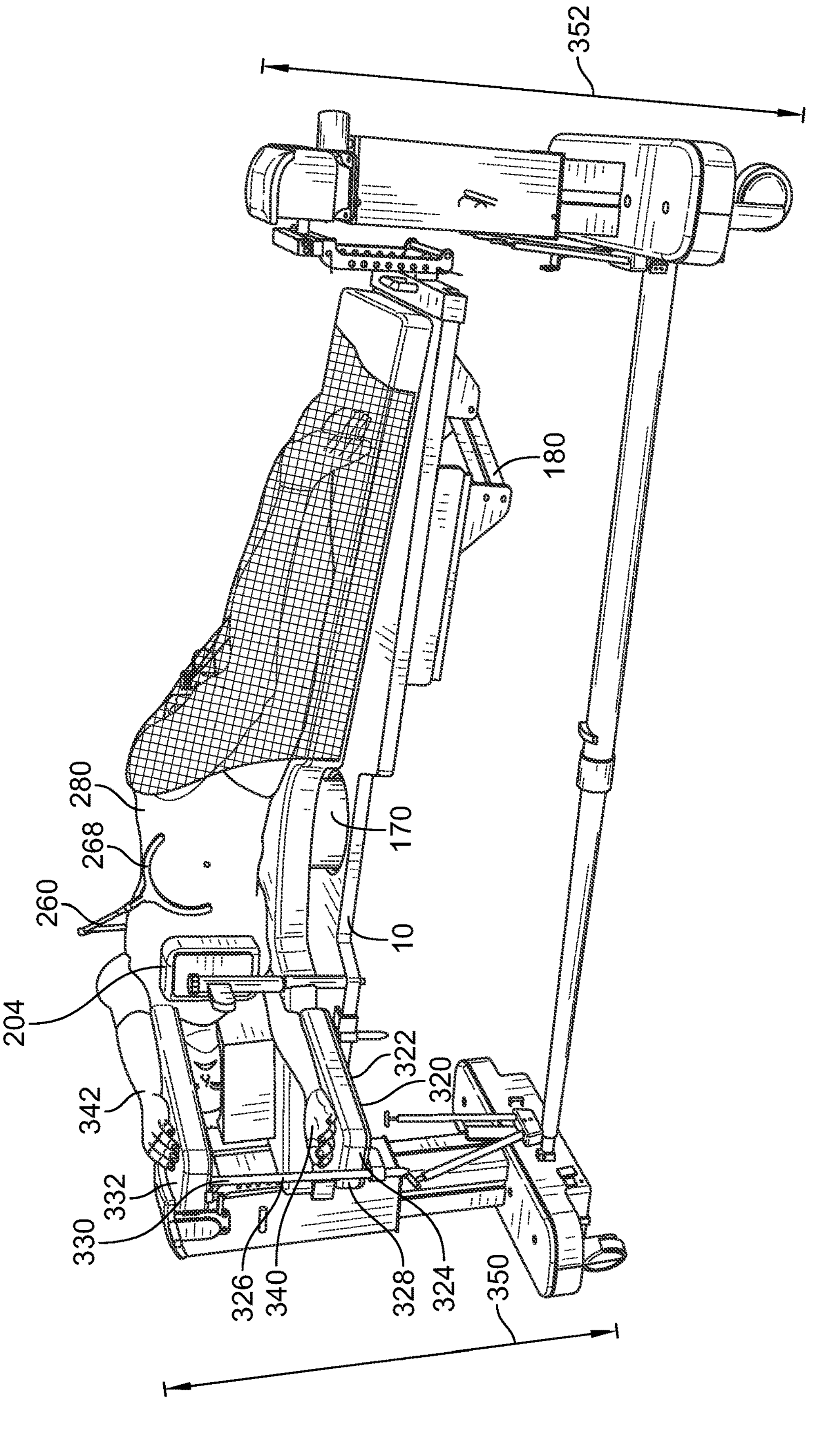
Figure 25:
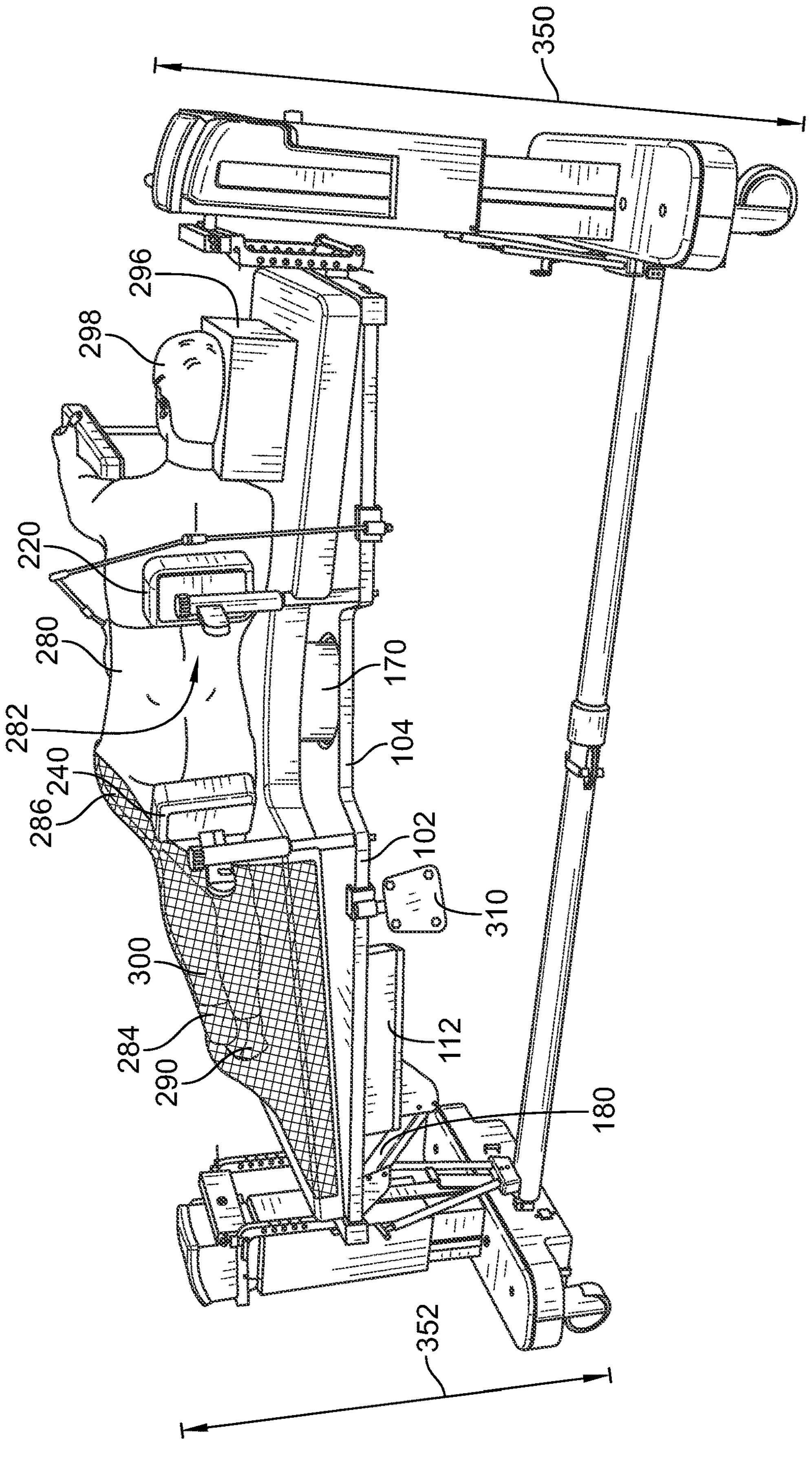
FIG. 25 is a perspective view of the surgical table shown in FIG. 24, wherein the posterior side of the patient is illustrated.

Referring now to FIGS. 24 and 25, the patient 280 is illustrated on the surgical table 10. As shown in FIG. 24, the chest retention pad 204 is positioned against the chest of the patient and the brace 268 of the articulating C-arm 260 is secured around the patient's abdomen. As shown in FIG. 25, the back retention pad 220 is secured against the patient's back and the thigh retention pad 240 is secured against the patient's thigh. A cushion 296 is positioned under the head 298 of the patient 280 for patient neck comfort. The actuator 170 is inflated to elevate the patient's hips and position the patient for the surgical procedure. Additionally, the side members 112 of the torso section 104 are dropped from the extended position and moved into the stowed position. As such, the left side notch 122 enables access to the surgical site 282 from below the patient 280, as shown in FIG. 25. That is, with the left side member 126 in the stowed position, the surgeon may move surgical instruments into and through the space created by the left side notch 122 to access the surgical site 282.

Both FIGS. 24 and 25 illustrate a mesh wrap 300 positioned around the legs 284 of the patient 280. The mesh wrap 300 is positioned around the hips 286 of the patient 280 and extended along the legs 284 of the patient 280 to the feet 290 of the patient 280. The mesh wrap 300 also extends from a left side of the table top 20 to a right side of the table top 20 and is wrapped around the patient support surface 140. The mesh wrap 300 is formed from a material that clings to the patient support surface 140 to tightly secure the legs 284 of the patient 280 to the patient support surface 140. For example, the mesh wrap 300, in some embodiments, is formed from an elastic material. In other embodiments, the mesh wrap 300 may be formed from any material suitable for clinging to the patient support surface 140. In an exemplary embodiment, the mesh wrap 300 is disposable. As illustrated in FIG. 25, a sensor adaptor 310 extends from the leg section 102 of the table top 20.

Referring to FIG. 24, an arm rest assembly 320 extends from the head section 100 of the table top 20. The arm rest assembly 320 includes a lower rod 322 that is coupled to the head section 100 of the table top 20 and extends horizontally from the head section 100. A lower arm rest 324 is positioned on the lower rod 322 to provide a position for the patient 280 to rest one of the patient's arms. In the illustrated embodiment, the patient's left arm 340 is positioned on the lower arm rest 324. In some embodiments, the lower arm rest 324 is configured as a foam cushion. In other embodiments, the lower arm rest 324 may include a gel or other suitable material for forming an arm rest.

A post 326 extends vertically from an end 328 of the lower rod 322. An upper rod 330 is coupled to the post 326 and extends horizontally and substantially parallel to the lower rod 322. A height of the post 326 is adjustable to adjust a height of the upper rod 330. That is, the height of the upper rod 330 is adjustable to accommodate a size of the patient, in particular, a distance between the patient's arms. An upper arm rest 332 is positioned on the upper rod 330 to provide a position for the patient 280 to rest the other of the patient's arms. In the illustrated embodiment, the patient's right arm 342 is positioned on the upper arm rest 332. In some embodiments, the upper arm rest 332 is configured as a foam cushion. In other embodiments, the upper arm rest 332 may include a gel or other suitable material for forming an arm rest.

In the illustrated embodiment, the arm rest assembly 320 is positioned adjacent the chest retention pad 204. That is, the lower arm rest 324 and the upper arm rest 332 extend from the head section 100 and are positioned adjacent the chest retention pad 204. The arm rest assembly 320 is coupled to the head section 100 at a position between the chest retention pad 204 and the head end 82 of the table top 20. As such, the lower arm rest 324 and the upper arm rest 332 extend from the head section 100 from a position between the chest retention pad 204 and the head end 82 of the table top 20.

Notably, as illustrated in FIGS. 24 and 25, the head end lift column 14 is raised to a height 350 greater than a height 352 of the foot end lift column 16. In this position, the table top 20 is angled downward from the head end 82 of the table top 20 to the foot end 84 of the table top 20. It will be appreciated that the head end lift column 14 and the foot end lift column 16 may be adjusted to any suitable heights for surgery. In some embodiments, the height 350 of the head end lift column 14 is different than the height 352 of the foot end lift column 16, as illustrated, to accommodate surgery. In other embodiment, the height 350 of the head end lift column 14 is the same as the height 352 of the foot end lift column 16 to accommodate surgery.

Figure 26:
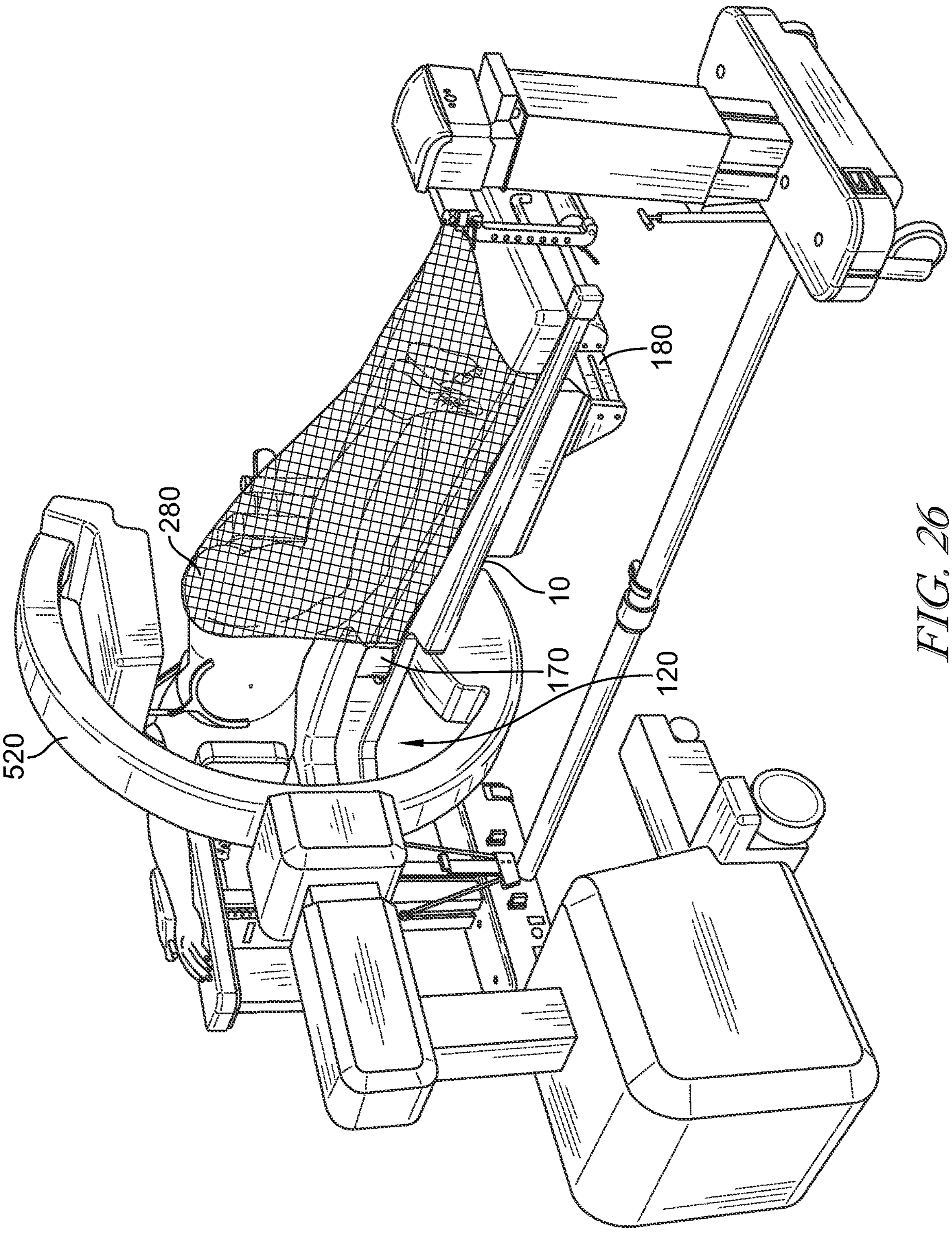
FIG. 26 is a perspective view of the surgical table shown in FIG. 1 and having a medical imaging device positioned around the patient.

Referring to FIG. 26, in addition to providing access to the surgical site 282, the notches 120 provide access for medical imaging equipment 520 while the patient 280 is on the surgical table 10. That is, when the side members 112 are moved to the stowed position, the notches 120 create a space to position medical imaging equipment 250 around the patient 280 while positioned on the surgical table 10. A computed tomography scanner is illustrated in FIG. 26; however, it will be appreciated that other medical imaging equipment may be utilized with the surgical table 10.

The surgical table 10 enables the disk space of the patient 280 to be removed and the implant inserted while the patient is in a lateral position. The surgical table 10 also allows for the insertion of the stabilizing rods and screws while the patient remains in the lateral position. Accordingly, the surgical table facilitates saving time during surgery, for example, up to 60 minutes, and the surgical table reduces infection rates to less than 1% from 4-6%.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used, the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles have been presented, they need not be utilized in combination, and many combinations of aspects and principles are possible in light of the various embodiments provided above.

The invention claimed is:

1. A surgical table comprising:

a pair of lift columns coupled by a rod extending between each of the pair of lift columns, and a table top extending longitudinally between each of the pair of lift columns, the table top forming a patient support surface configured to receive a patient, wherein the table top includes a head section, a leg section, and a torso section extending between the head section and the leg section, the torso section including:

a center member, the center member being adjustable to adjust an angle of the center member relative to the head section and the leg section, and a pair of side members, wherein each of the pair of side members is positioned on an opposite side of the center member, wherein each of the pair of side members is moveable from the position adjacent the center member to a stowed position, wherein, when moved to the stowed position, each of the pair of side members is moved longitudinally with respect to the table top in a direction away from the head section and toward the leg section to be positioned underneath the leg section in the stowed position.

2. The surgical table of claim 1, wherein each of the pair of lift columns is adjustable to adjust a height of the respective lift column.

3. The surgical table of claim 2, wherein each of the pair of lift columns includes:

a base configured to position on a floor, an inner column extending from the base, and an outer column telescopically coupled to the inner column and configured to move between a lowered position and a raised position along a vertical axis of the inner column.

4. The surgical table of claim 1, wherein:

each of the pair of lift columns includes a column bracket having a plurality of opening pairs configured to receive a locking rod, and each of the head section and leg section of the table top includes a table bracket configured to receive the locking rod, wherein each table bracket is configured to align with a respective column bracket so that the locking rod extends between the table bracket and one of the plurality of opening pairs to secure the table top to the respective lift column.

5. The surgical table of claim 1, wherein each of the pair of lift columns is adjustable in height to adjust a height of the table top.

6. The surgical table of claim 1, wherein the center member of the torso section includes a pair of notches positioned on opposite sides of the center member, wherein each of the pair of side members is positioned within a respective notch when each of the pair of side members is in the position adjacent the center member.

7. The surgical table of claim 6, wherein, when each of the pair of side members is in the position adjacent the center member, a top surface of each of the pair of side members is substantially flush with a top surface of the center member.

8. The surgical table of claim 6, wherein each of the pair of side members is coupled to an articulating assembly to move each of the pair of side members between the position adjacent the center member and the stowed position.

9. The surgical table of claim 8, wherein the articulating assembly includes:

a side member bracket coupled to the respective side member, a sliding bracket coupled to a track extending along the leg section, and an articulating arm extending between the side member bracket and the sliding bracket.

10. The surgical table of claim 9, wherein the articulating arm rotates about both the side member bracket and the sliding bracket to lower the respective side member from the position adjacent the center member to a lowered position.

11. The surgical table of claim 10, wherein the sliding bracket moves along the track to move the respective side member between the lowered position and the stowed position.

12. The surgical table of claim 1, wherein, when the pair of side members are positioned in the stowed position, the torso section includes a notch that enables a surgeon to access a surgical site on the patient from below the patient.

13. The surgical table of claim 1, wherein, when the pair of side members are positioned in the stowed position, the torso section includes a notch that enables a medical imaging device to be positioned around the patient.

14. The surgical table of claim 1, wherein the center member of the torso section includes an actuator to adjust the angle of the center member relative to the head section and the leg section.

15. The surgical table of claim 14, wherein the actuator includes an inflatable bladder.

16. The surgical table of claim 1, wherein the angle of the center member relative to the head section and the leg section is adjustable up to and including 15 degrees relative to the head section and the leg section.

17. The surgical table of claim 1, further comprising:

a chest retention post extending vertically from the head section, and a chest retention arm extending horizontally from the chest retention post, a chest retention pad coupled to an end of the chest retention arm, wherein the chest retention arm is movable horizontally relative to the chest retention post to adjust a position of the chest retention pad, and wherein the chest retention pad rotates relative to the chest retention arm to adjust a position of the chest retention pad.

18. The surgical table of claim 1, further comprising:

a back retention post extending vertically from the head section, and a back retention arm extending horizontally from the back retention post, a back retention pad coupled to an end of the back retention arm, wherein the back retention arm is movable horizontally relative to the back retention post to adjust a position of the back retention pad, and wherein the back retention pad rotates relative to the back retention arm to adjust a position of the back retention pad.

19. The surgical table of claim 1, further comprising:

a thigh retention post extending vertically from the leg section, and a thigh retention arm extending horizontally from the thigh retention post, a thigh retention pad coupled to an end of the thigh retention arm, wherein the thigh retention arm is movable horizontally relative to the thigh retention post to adjust a position of the thigh retention pad, and wherein the thigh retention pad rotates relative to the thigh retention arm to adjust a position of the thigh retention pad.

20. The surgical table of claim 1, wherein each of the pair of side members of the torso section includes hip indicia, wherein a hip of the patient is aligned with the hip indicia, when the patient is positioned on the table top.

21. The surgical table of claim 1, further comprising a mesh wrap configured to position around legs of the patient, wherein the mesh wrap clings to the table top to secure the patient on the table top.

22. The surgical table of claim 1, further comprising at least one retention pad configured to position against the patient.

23. The surgical table of claim 22, wherein the at least one retention pad includes:

a chest retention pad extending from the head section and configured to position against a chest of the patient, a back retention pad extending from the head section and configured to position against a back of the patient, and a thigh retention pad extending from the leg section and configured to position against a thigh of the patient.

24. The surgical table of claim 1, further comprising an articulating C-arm extending from the head section and configured to position around the patient and against an abdomen of the patient.

25. The surgical table of claim 1, further comprising a pair of arm rests extending from the head section, wherein each of the pair of arm rests is configured to receive an arm of the patient.

26. The surgical table of claim 25, wherein:

each of the arm rests extends horizontally from the head section, and each of the arm rests is positioned adjacent a chest retention pad.

* * * * *